(12) United States Patent
Wang et al.

(10) Patent No.: US 8,472,158 B2
(45) Date of Patent: *Jun. 25, 2013

(54) PROTECTIVE DEVICE

(75) Inventors: Chung-Hsiung Wang, Hsinchu (TW);
Hung-Ming Lin, Hsinchu County (TW);
Lang-Yi Chiang, Keelung (TW);
Wen-Shiang Luo, Taipei (TW);
Kuo-Shu Chen, Taoyuan County (TW)

(73) Assignee: Cyntec Co., Ltd., Hsinchu (TW)

( * ) Notice: Subject to any disclaimer, the term of this patent is extended or adjusted under 35 U.S.C. 154(b) by 373 days.

This patent is subject to a terminal disclaimer.

(21) Appl. No.: 12/875,752

(22) Filed: Sep. 3, 2010

(65) Prior Publication Data

US 2011/0058295 A1    Mar. 10, 2011

(30) Foreign Application Priority Data

| Sep. 4, 2009 | (TW) | 98129872 A |
| Sep. 4, 2009 | (TW) | 98129874 A |
| May 14, 2010 | (TW) | 99115506 A |

(51) Int. Cl.
   *H02H 5/00* (2006.01)

(52) U.S. Cl.
   USPC ............................................. 361/104

(58) Field of Classification Search
   USPC ................................................ 361/104
   See application file for complete search history.

(56) References Cited

U.S. PATENT DOCUMENTS

| 5,712,610 | A | 1/1998 | Takeichi et al. | 337/290 |
| 5,939,969 | A | 8/1999 | Doerrwaechter et al. | |
| 6,344,633 | B1 | 2/2002 | Furuuchi | 219/517 |
| 6,452,475 | B1 | 9/2002 | Kawazu et al. | 337/290 |
| 6,566,995 | B2 | 5/2003 | Furuuchi et al. | 337/183 |
| 7,286,037 | B2 | 10/2007 | Furuuchi | 337/290 |
| 7,382,088 | B2 * | 6/2008 | Azuma et al. | 313/495 |
| 7,557,434 | B2 * | 7/2009 | Malhan et al. | 257/678 |
| 7,951,699 | B2 * | 5/2011 | Iwasaki et al. | 438/613 |
| 2001/0044168 | A1 | 11/2001 | Furuuchi et al. | |
| 2002/0014945 | A1 | 2/2002 | Furuuchi et al. | |
| 2005/0140491 | A1 | 6/2005 | Uehara et al. | |
| 2005/0141164 | A1 | 6/2005 | Bender et al. | |
| 2006/0028314 | A1 | 2/2006 | Furuuchi | |

FOREIGN PATENT DOCUMENTS

| CN | 1795280 | | 6/2006 |
| CN | 1848351 | A | 10/2006 |
| CN | 1897203 | A | 1/2007 |
| CN | 101373680 | A | 2/2009 |

(Continued)

OTHER PUBLICATIONS

"First Office Action of China Counterpart Application", issued on Oct. 12, 2012, p. 1-p. 5.

(Continued)

*Primary Examiner* — Stephen W Jackson
(74) *Attorney, Agent, or Firm* — Birch, Stewart, Kolasch & Birch, LLP

(57) ABSTRACT

A protective device including a substrate, a conductive section and a first auxiliary medium is provided. The conductive section is supported by the substrate, wherein the conductive section comprises a metal element electrically connected between first and second electrodes. The metal element serves as a sacrificial structure having a melting point lower than that of the first and second electrodes. The first auxiliary medium is disposed between the metal element and the substrate, wherein the first auxiliary medium has a melting point lower than that of the metal element. The first auxiliary medium facilitates breaking of the metal element upon melting.

16 Claims, 19 Drawing Sheets

FOREIGN PATENT DOCUMENTS

| | | |
|---|---|---|
| CN | 101399100 | 4/2009 |
| JP | 62-136231 | 3/1987 |
| JP | 62107341 | 7/1987 |
| JP | 05-174678 | 7/1993 |
| JP | 07-153367 | 6/1995 |
| JP | 09213184 | 8/1997 |
| JP | 2000-011831 | 1/2000 |
| JP | 2001-118481 | 4/2001 |
| JP | 2001509945 | 7/2001 |
| JP | 2001-222938 | 8/2001 |
| JP | 2001-325868 A | 11/2001 |
| JP | 2004179309 | 6/2004 |
| JP | 2004-185960 | 7/2004 |
| JP | 2004-265617 | 9/2004 |
| JP | 2005-129352 | 5/2005 |
| JP | 2005-150075 | 6/2005 |
| JP | 2009-259724 | 11/2009 |
| TW | M363673 | 8/2009 |
| TW | M363674 | 8/2009 |

OTHER PUBLICATIONS

"Office Action of Japan Counterpart Application", issued on Aug. 28, 2012, p. 1-p. 3.

"Office Action of U.S. Counterpart Application", issued on Aug. 2, 2012, p. 1-p. 12.

"Office Action of Japan Counterpart Application", issued on Aug. 7, 2012, p. 1-p. 3.

* cited by examiner

PROTECTIVE DEVICE

CROSS-REFERENCE TO RELATED APPLICATION

This application claims the priority benefit of Taiwan application serial no. 98129872, filed on Sep. 4, 2009, Taiwan application serial no. 99115506, filed on May 14, 2010 and Taiwan application serial no. 98129874, filed on Sep. 4, 2009. The entirety of each of the above-mentioned patent applications is hereby incorporated by reference herein and made a part of this specification.

BACKGROUND OF THE INVENTION

1. Field of the Invention

The present invention relates to a protective device applied to an electronic device, and more particularly to a protective device which prevents over currents and over voltages.

2. Description of Related Art

In recent years, due to the boom in information technologies (IT), IT products such as cell phones, computers and personal digital assistants are commonplace. With their help, demands in various aspects such as food, clothing, housing, travelling, education, and entertainment are met, and people are becoming more and more dependent on IT products. However, lately there has been news about exploding batteries of portable electronic products during charging and discharging. Hence, the industry has been enhancing protective measures used during charging and discharging of batteries, so as to prevent explosions of batteries during charging and discharging because of over voltages or over currents.

Prior arts provide protective devices having protective methods in which a temperature fuse is serially connected with a circuit of a battery, and the temperature fuse in the protective device and a heater are electrically connected to controlling units such as a field effect transistor (FET) and an integrated circuit (IC). Therefore, when the IC senses an over voltage, it drives the FET, so that a current passes through the heater which heats up to melt the temperature fuse, thereby making the circuit of the battery disconnected and achieving protection from over voltages. In addition, when an over current occurs, the massive current flows through the temperature fuse, thereby melting the temperature fuse, so that the circuit of the battery is disconnected to achieve the purpose of protection against over currents.

SUMMARY OF THE INVENTION

An object of the present invention is to provide a protective device for effectively preventing over-current and over-voltage.

In one aspect, the present invention provides a protective device for a electrical circuit, comprising a substrate supporting a conductive section that includes a metal element electrically connected between first and second electrodes, wherein the metal element serves as a sacrificial structure having a melting point lower than that of the first and second electrodes, and a first auxiliary medium disposed between the metal element and the substrate, wherein the first auxiliary medium having a melting point lower than that of the metal element, and wherein the first auxiliary medium facilitates breaking of the metal element upon melting to protect the electric circuit from over voltage and/or current. The protective device may be provided with a heat-generating element supported by the substrate, providing heat to at least the auxiliary medium. The heat-generating element may be supported between the metal element and the substrate or supported by a side of the substrate away from the heating element.

In another aspect of the present invention, the protective device further comprises an intermediate support (e.g., another electrode) disposed between the metal element and the substrate, wherein the auxiliary medium are disposed on either side of the intermediate support. The intermediate support further facilitates breaking of the metal element upon melting to protect the electric circuit. The intermediate support is heated by the heat generating element, if provided.

In another aspect of the present invention, the protective device further comprises a first intermediate layer (e.g., a solder layer) between the metal element and the intermediate support, wherein the intermediate layer has a first fusing temperature lower than the melting temperature of the metal element. The first intermediate layer fuses with the metal element to further facilitate breaking of the metal structure upon melting to protect the electric circuit. Further second intermediate layer (e.g., another solder layer) having a lower fusing temperature may be provided between the metal element and the first and second electrodes.

In a further aspect of the present invention, a heat insulation portion is provided between the heating element and the first and second electrodes, wherein heat transfer to the intermediate support is at a higher rate than that to the first and second electrodes.

In yet another aspect of the present invention, at least the first electrode comprises a protrusion extending towards the metal element, wherein the protrusion provides additional contact for melted metal element to facilitate breaking of the metal element to protect the circuit.

In one embodiment, the invention provides a protective device including a substrate, a first electrode, a second electrode, a first auxiliary medium and a metal element. The first electrode is disposed on the substrate. The second electrode is disposed on the substrate. The first auxiliary medium is disposed on the substrate and between the first electrode and the second electrode. The metal element is connected to the first electrode and the second electrode, wherein the first auxiliary medium is disposed between the substrate and the metal element.

According to an embodiment of the invention, the protective device further includes a third electrode, a fourth electrode and a heat-generating element. The third electrode is disposed on the third peripheral portion of the substrate. The fourth electrode is disposed on the fourth peripheral portion of the substrate. The heat-generating element is disposed on the substrate and connected between the third electrode and the fourth electrode.

According to an embodiment of the invention, the protective device further includes a housing disposed on the first surface of the substrate and covering the metal element.

According to an embodiment of the invention, the intermediate support includes a notch structure located on a surface of the intermediate support contacting to the metal element.

According to an embodiment of the invention, the substrate has a first insulating block and a second insulating block connected to the first insulating block, and a thermal conductivity coefficient of the first insulating bock is greater than that of the second insulating block.

In light of the above, the auxiliary medium is embedded in the protective device of the present invention, and the auxiliary medium is disposed between the metal element and the heat-generating element. Therefore, when the heat-generating element generates heat, the auxiliary medium effectively helps melt the metal element. Furthermore, at least one of the first electrode and the second electrode of the protective device has a protrusion. Hence, when the heat-generating element generates heat, the auxiliary medium which is heated effectively facilitates melting of the metal element, and the melted metal element flows towards the protrusion due to surface tension, meaning that the protrusion increase flowing space and adhesive area of the melted metal element, thereby preventing short-circuiting caused by the melted metal element electrically connecting the extending portions and the electrodes. In addition, the protective device of the present invention has a low thermal conductive layer, and when the heat-generating element generates heat, heat can be transferred to the third electrode concentratively via the substrate. Therefore, the metal element located over the third electrode will be blown firstly to reduce the melt value of the metal element, and over voltage protection or an over current protection is achieved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A to 3C are top views illustrating steps for manufacturing the protective device according to one embodiment of the present invention, while

DESCRIPTION OF THE EMBODIMENTS

Figure 1A:
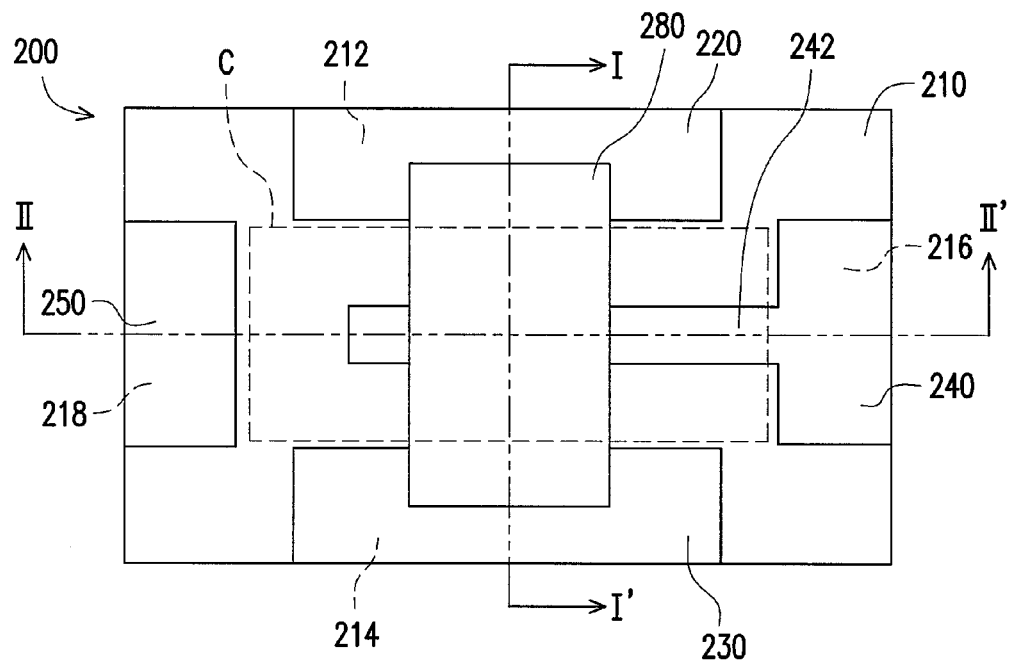
FIG. 1A is a top view of a protective device according to one embodiment of the present invention.
Figure 1B:
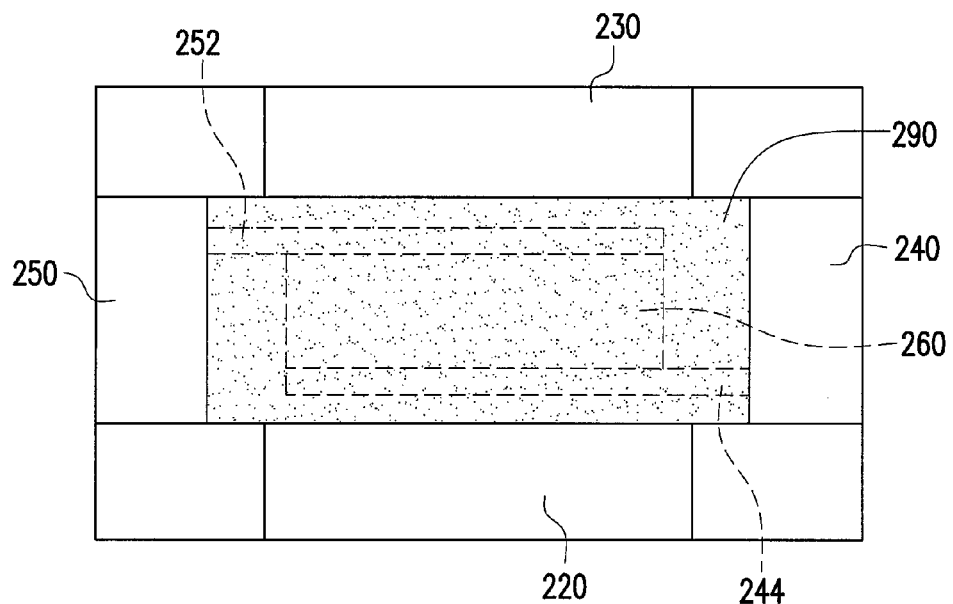
FIG. 1B is a bottom view of the protective device shown in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

Referring to FIGS. 1A, 1B, 1C, and 1D, according to one embodiment of the present invention, a protective device is provided. The protective device 200 of the present embodiment includes a substrate 210, a first electrode 220, a second electrode 230, a third electrode 240, a fourth electrode 250, a heat-generating element 260, an auxiliary medium 270, and a conductive section. The first electrode 220, the second electrode 230, the third electrode 240, and the fourth electrode 250 are respectively disposed on the substrate 210. Herein, the conductive section is supported by the substrate 210 and includes a metal element 280 electrically connected between the first electrode 210 and the second electrode 220. The metal element 280 serves as a sacrificial structure having a melting point lower than that of the first electrode 210 and the second electrode 220.

In detail, in the present embodiment, the substrate 210 includes a central portion C, a first peripheral portion 212, a second peripheral portion 214, a third peripheral portion 216, and a fourth peripheral portion 218, wherein the central portion C is surrounded by the first peripheral portion 212, the second peripheral portion 214, the third peripheral portion 216, and the fourth peripheral portion 218. The first peripheral portion 212 is disposed corresponding to the second peripheral portion 214, and the third peripheral portion 216 is disposed corresponding to the fourth peripheral portion 218. The first electrode 220, the second electrode 230, the third electrode 240 and the fourth electrode 250 are respectively disposed on the first peripheral portion 212, the second peripheral portion 214, the third peripheral portion 216, and the fourth peripheral portion 218. The substrate 210 has a first surface S1 and a second surface S2 opposite thereto. The first electrode 220, the second electrode 230, the third electrode 240, and the fourth electrode 250 all extend from the first surface S1 to the second surface S2. However, the present invention is not limited thereto, each of the electrodes can be disposed or not disposed on the first surface S1 or the second surface S2 as required. In another embodiment, the fourth electrode 250 can be disposed on the second surface S2 only.

Furthermore, according to the present embodiment, an intermediate support 242 and a second extending portion 244 of the third electrode 240 are respectively disposed on the first surface S1 and the second surface S2, and respectively extend to a location on or over the central portion C. According to the present embodiment, the intermediate support 242 and the second extending portion 244 are respectively disposed on two planes which are substantially parallel but do not overlap with each other. A third extending portion 252 of the fourth electrode 250 is disposed on the second surface S2 and extends to a location on or over the central portion C. The intermediate support 242, the second extending portion 244, and the third extending portion 252 are respectively disposed between the first electrode 220 and the second electrode 230. In addition, here it should be noted that the forms of the intermediate support 242 are not limited in the invention, the intermediate support may be an independent part on the substrate without contact with the electrodes, and include a material having a good thermal conductivity to facilitate breaking of the metal element upon melting.

A material of the substrate 210 includes ceramic, glass epoxy resin, zirconium oxide ($ZrO_2$), silicon nitride ($Si_3N_4$), aluminum nitride (AlN), boron nitride (BN), or other inorganic materials, for example. A material of the first electrode 220, the second electrode 230, the third electrode 240, and the fourth electrode 250 is, for example, silver, copper, gold, nickel, silver-platinum alloy, nickel alloy and other material with good electrical conductivity.

Figure 1C:
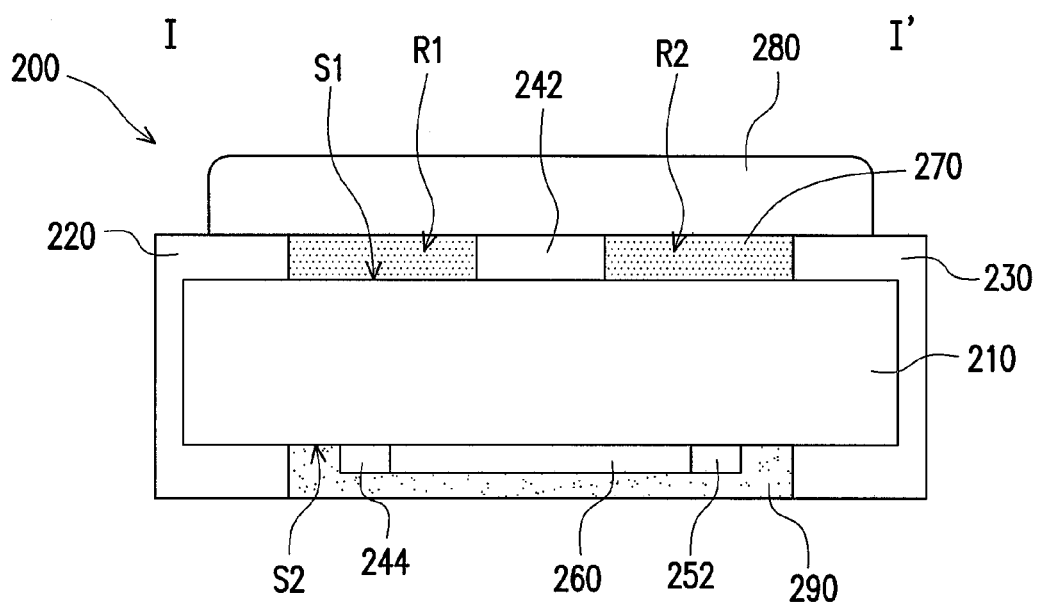
FIG. 1C is a cross-sectional view illustrating the protective device along a sectional line I-I' in FIG. 1A.
Figure 1D:
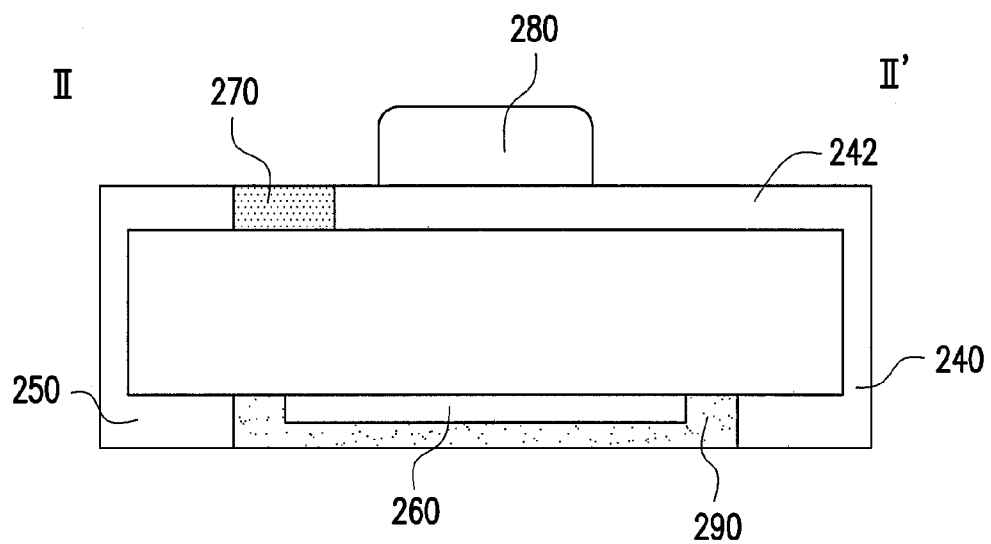
FIG. 1D is a cross-sectional view illustrating the protective device along a sectional line II-IP in FIG. 1A.

The heat generating element 260 is disposed on the second surface S2 and connected between the second extending portion 244 and the third extending portion 252, wherein the intermediate support 242 of the third electrode 240 is disposed over the heat-generating element 260 (as shown in FIG. 1C). A material of the heat-generating element 260 includes ruthenium dioxide ($RuO_2$), carbon black doped in an inorganic adhesive, copper, titanium, nickel-chromium alloy, and nickel-copper alloy, for example. Moreover, in order to protect the heat-generating element 260 from being affected by subsequent manufacturing process and humidity, acidity and alkalinity of the ambient environment, the heat-generating element 260 is covered by an insulating layer 290 made of frit glue or epoxy resin.

The auxiliary medium 270 is disposed on the first surface S1 of the substrate 210 and around the intermediate support 242, wherein the auxiliary medium 270 is located between the metal element 280 and the substrate 210. In detail, according to the present embodiment, the auxiliary medium 270 is disposed among the first electrode 220, the second electrode 230, and the intermediate support 242. Specifically, the auxiliary medium 270 is filled in a first trench R1 formed by the first electrode 220, the intermediate support 242 and the substrate 210, and is filled in a second trench R2 formed by the second electrode 230, the intermediate support 242, and the substrate 210. In other words, the auxiliary medium 270 is disposed between on either side of the intermediate support 242. The auxiliary medium 270 has a melting point lower than that of the metal element 280, and the auxiliary medium 270 facilitates breaking of the metal element 280 upon melting. The auxiliary medium 270 is made of resin, pine resin, or etc.

The metal element 280 is disposed on the first electrode 220, the intermediate support 242 and the second electrode 230 and covers a portion of the auxiliary medium 270, wherein the auxiliary medium 270 and the intermediate support 242 are both disposed between the heat-generating element 260 and the metal element 280, and a melting point of the auxiliary medium 270 is lower than a melting point of the metal element 280. Therefore, when a control unit (not shown) detects an over voltage state and drive the heat-generating element 260 to generate heat to blow the metal element 280, the auxiliary medium 270 is covered by the metal element 280 and surrounded by the first electrode 220, the second electrode 230, and the intermediate support 242, the auxiliary medium 270 can effectively help the metal element 280 disposed over the auxiliary medium 270 to be blown, and thereby an over voltage protection of the protective device can be achieved. In other words, since the auxiliary medium 270 of the present embodiment is embedded in the protective device 200, it facilitates melting and flowing of the metal element 280, thereby helping blow the metal element 280. Some of the advantages of the auxiliary medium 270 is that it can increase the wetness between the melted metal element 280 and each of the electrodes, and enhance a cohesive force of the melted metal element 280 itself, such that the melted metal element 280 can flow and congregate on each of the electrodes, thus effectively blowing the metal element 280.

Figure 2:
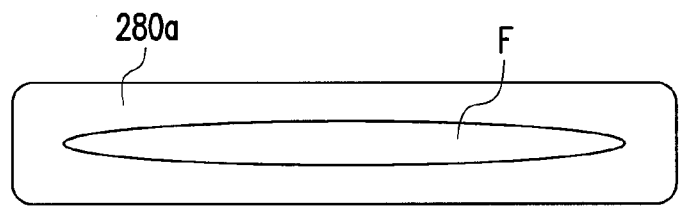
FIG. 2 shows a different structure of the metal element in FIG. 1A.

A material of the metal element 280 includes tin-lead alloy, tin-silver-lead alloy, tin-indium-bismuth-lead alloy, tin-antimony alloy, tin-silver-copper alloy, and other alloy with a low melting point. Moreover, in other embodiments, an auxiliary medium F (shown by FIG. 2) can be embedded in the metal element 280a, so as to help blow the metal element 280a by heat. It should be noted that, although the present invention is described using a protective device having the heat-generating element to simultaneously achieve the over voltage protection and the over current protection, persons of ordinary skill in the art should know that the feature of disposing the auxiliary medium 270 below the metal element 280 to facilitate the stability of effectively blowing the metal element 280 can also be applied to a structure having no heat-generating element to facilitate the stability of blowing the metal element 280 when an over current occurs to cause the metal element 280 to be melted by heat.

In the present embodiment, since the auxiliary medium 270 can help melt the metal element 280, it is required to appropriately adjust a ratio of a cross-section area of the metal element 280 to a total contact area between the auxiliary medium 270 and each electrode so as to achieve good stability of blowing the metal element. For example, the ratio of the cross-section area of the metal element 280 to the total contact area between the auxiliary medium 270 and each electrode can be less than 1.3. Specifically, when the size of the protective device is reduced and the surge protection requirement remains unchanged, the total contact area between the auxiliary medium 270 and each electrode can be adjusted to achieve better design. For example, in the present embodiment, the cross-section area of the metal element 280 is the area of the section (e.g. the section shown by FIG. 1D) perpendicular to the current direction of the metal element 280; the total contact area between the auxiliary medium 270 and each electrode refers to the total surface area (as shown by FIGS. 1A and 1C) of the auxiliary medium 270 in a first trench R1 and a second trench R2 that is respectively in contact with the first electrode 220, the intermediate support 242, and the second electrode 230.

Furthermore, because the auxiliary medium 270 increases the wetness as well as the cohesive force between the melted metal element 280 and each electrode, the melted metal congregates on the first electrode 220, the intermediate support 242 and the second electrode 230 when the metal element 280 is blown, thereby preventing the melted metal from causing a short circuit of the intermediate support 242, the first electrode 220, or the second electrode 230. Therefore, effectively blowing the metal element 280 to prevent the over voltage and the over current effectively can be further ensured. In brief, when the ratio of the cross-section area of the metal element 280 to the total contact area between the auxiliary medium 270 and each electrode is less than 1.3, the reliability of effectively blowing the metal element 280 is enhanced.

Figure 3A:
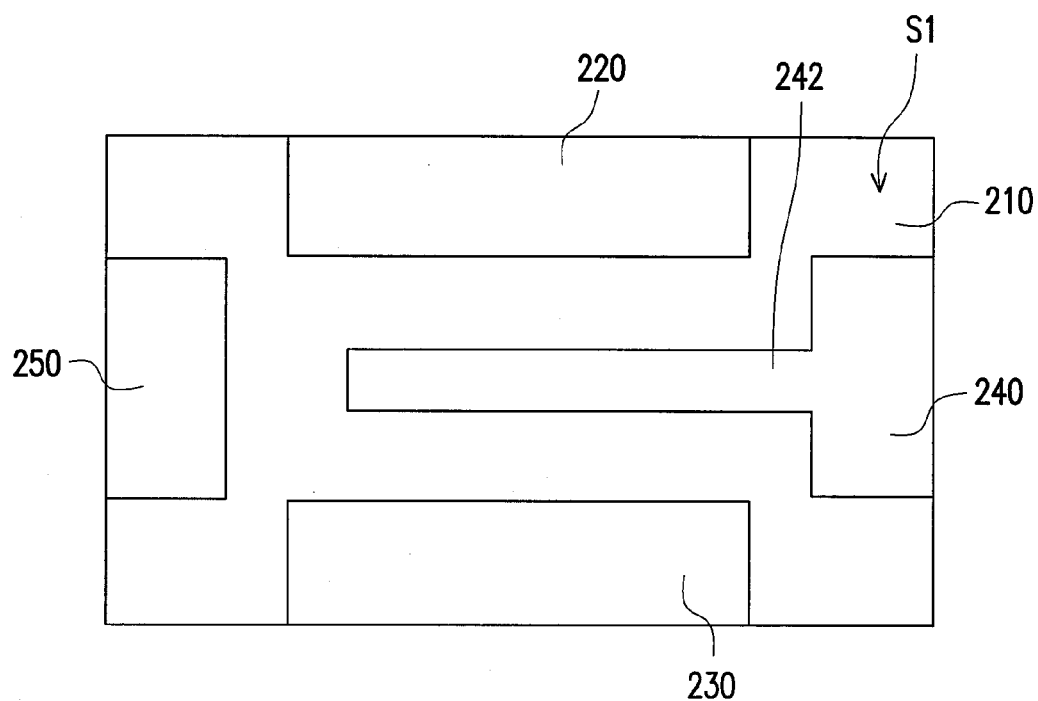
Figure 3B:
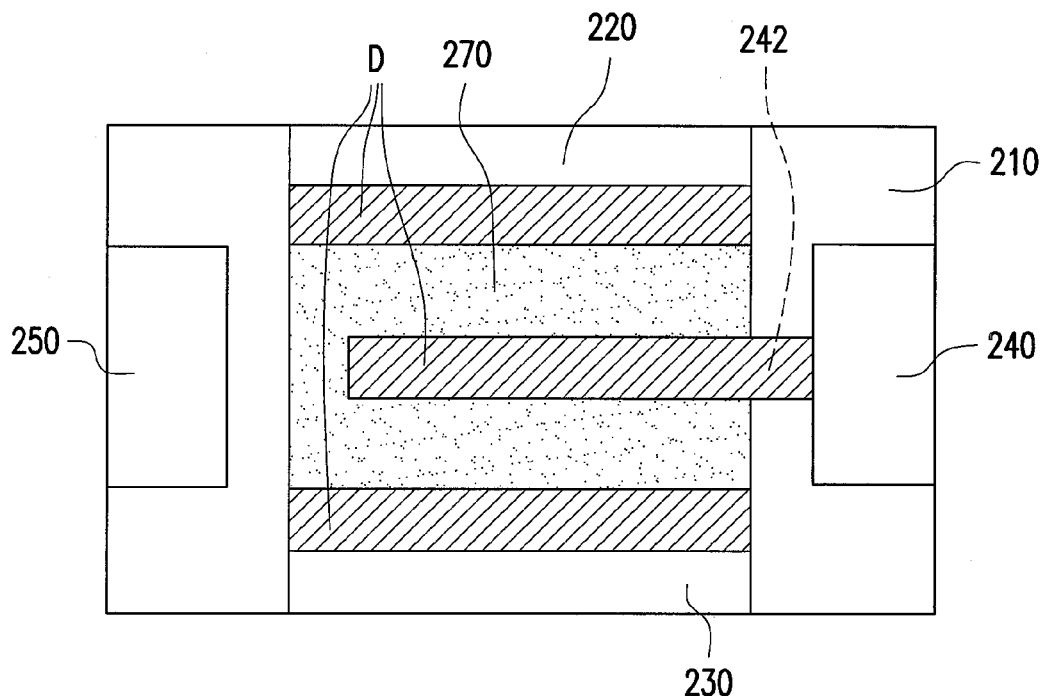
Figure 3C:
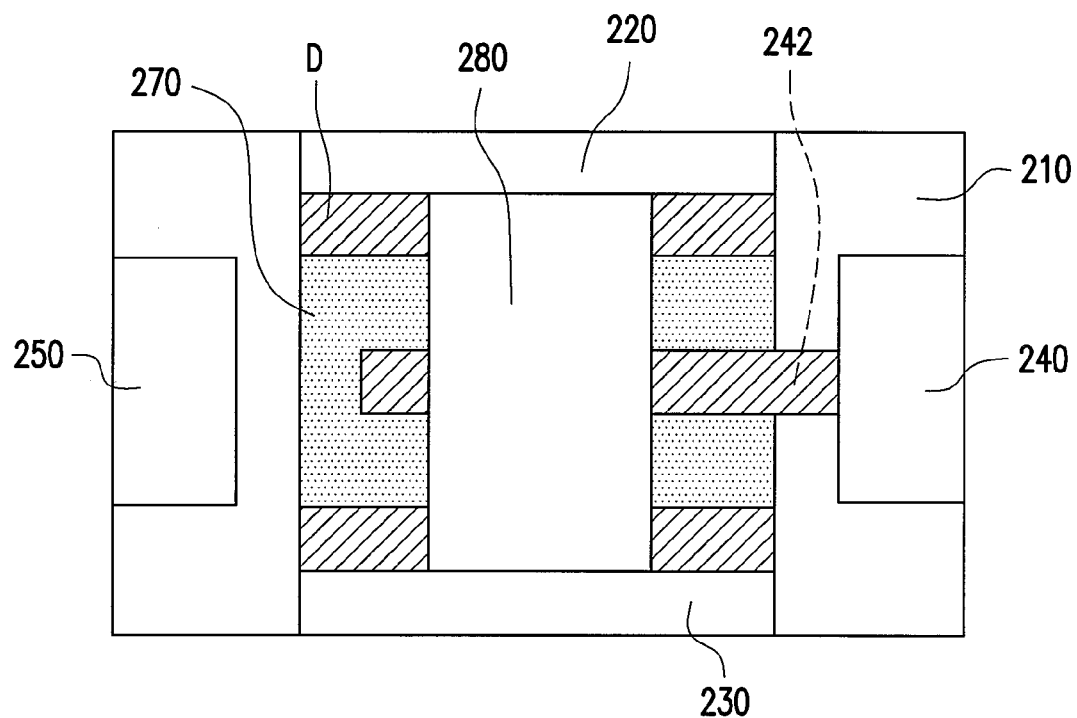
Figure 4A:
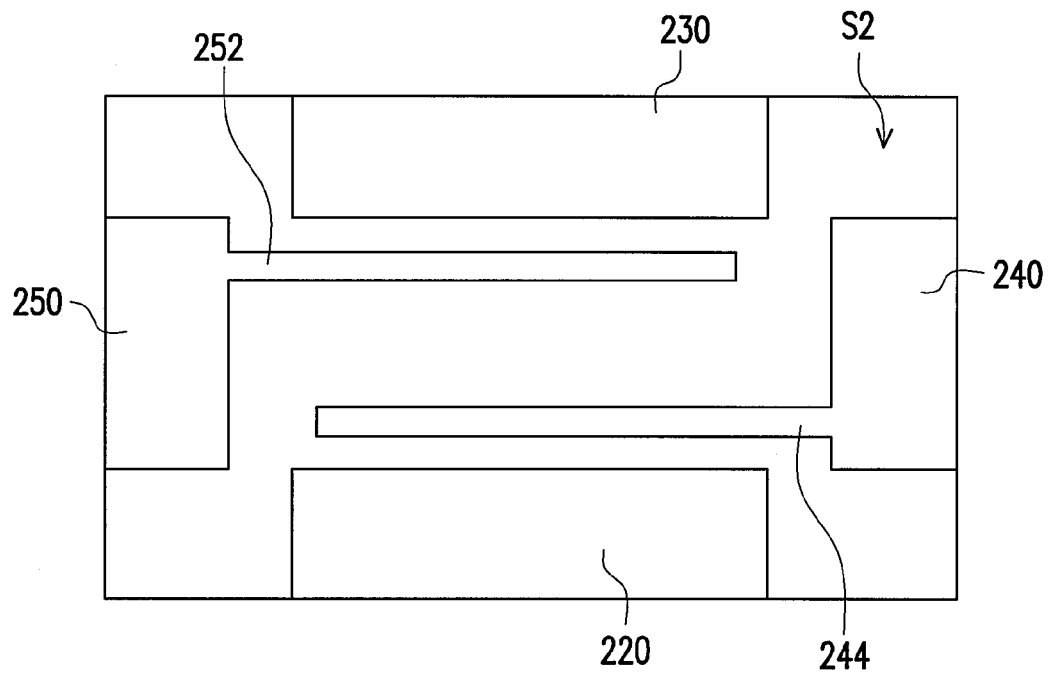
FIGS. 4A to 4C are bottom views illustrating steps for manufacturing the protective device in FIGS. 3A to 3C.
Figure 4B:
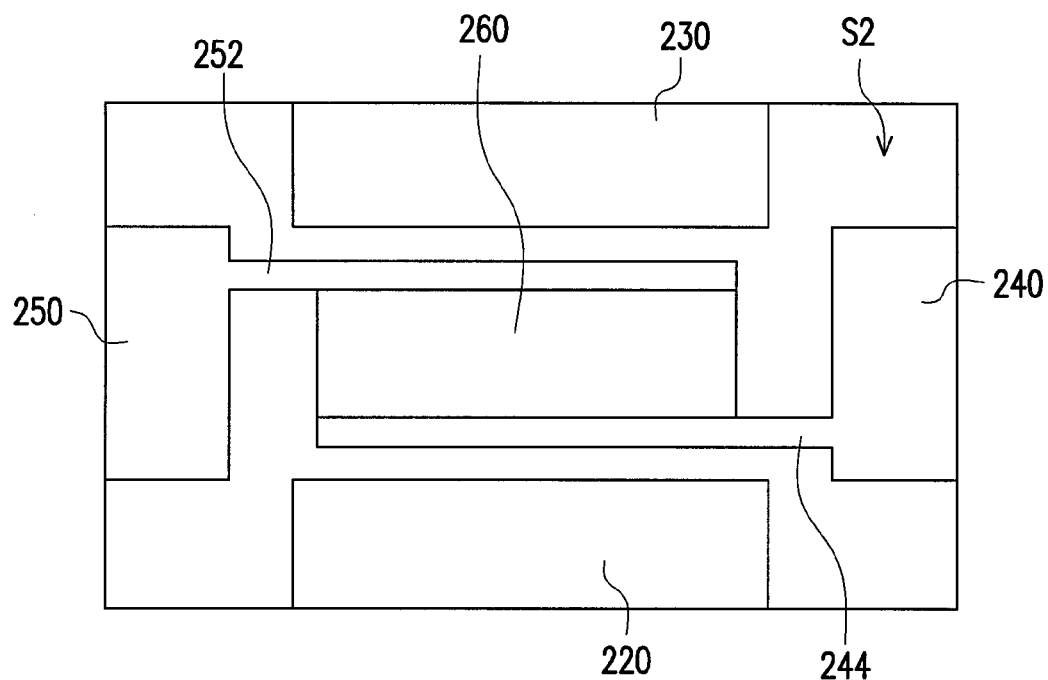
Figure 4C:
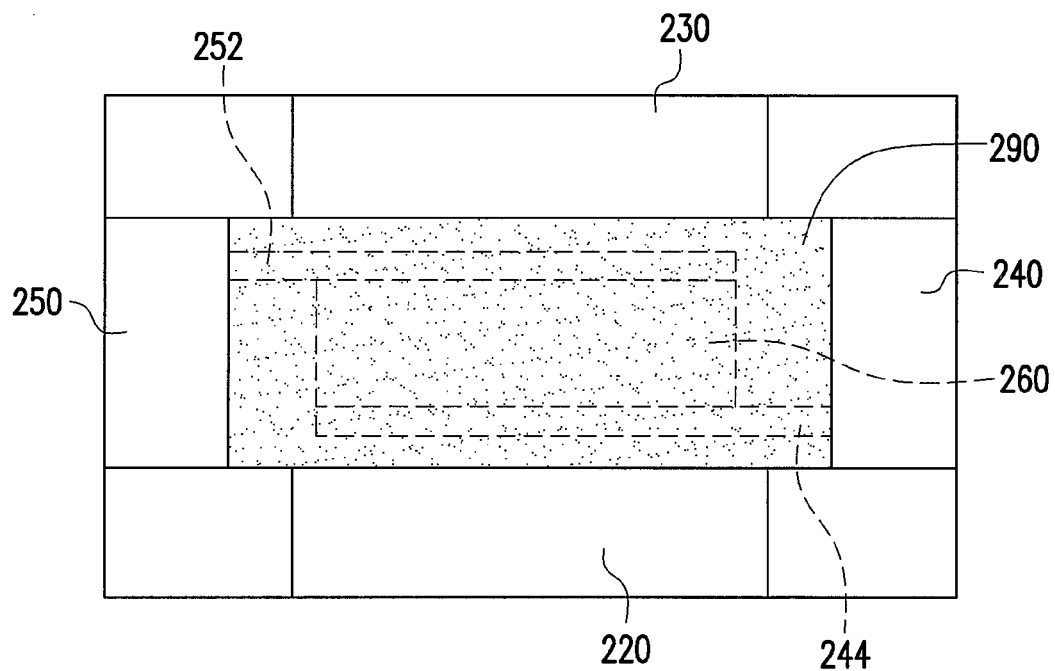

A manufacturing method of the protective device 200 is described in detail as follows. FIGS. 3A to 3C are top views illustrating steps for manufacturing the protective device according to one embodiment of the present invention, while FIGS. 4A to 4C are bottom views illustrating steps for manufacturing the protective device in FIGS. 3A to 3C. It should be noted that, the elements in FIGS. 1A to 1D, which are named and labelled identically to those in FIGS. 3A to 3C and 4A to 4C, have the materials similar thereto. Therefore, the detailed descriptions are not repeated herein.

First, referring to FIGS. 3A and 4A, a substrate 210 is provided and has a first surface S1 and a second surface S2 opposite thereto. A first electrode 220, a second electrode 230, a third electrode 240, and a fourth electrode 250 are formed on the substrate 210, and extend from the first surface S1 to the second surface S2. The electrodes are formed by printing, electroplating, sputtering or any other proper means.

According to the present embodiment, an intermediate support 242 and a second extending portion 244 of the third electrode 240 are respectively disposed on the first surface S1 and the second surface S2. A third extending portion 252 of the fourth electrode 250 is disposed on the second surface S2. The intermediate support 242, the second extending portion 244, and the third extending portion 252 are respectively disposed between the first electrode 220 and the second electrode 230.

Then, referring to FIGS. 4B and 4C, a heat-generating element 260 is formed on the second surface S2 of the substrate 210 and electrically connected to the second extending portion 244 and the third extending portion 252 by thick film printing, for example. Thereafter, an insulating layer 290 is coated on the heat-generating element 260 to protect the heat-generating element 260 from being affected by the subsequent manufacturing processes and the humidity, acidity and alkalinity of the ambient environment.

Referring to FIG. 3B, a solder layer D as an intermediate layer is formed, for example, by coating on the first electrode 220, the second electrode 230, and the intermediate support 242 of the third electrode 240. After that, an auxiliary medium 270 is formed, for example, by coating on the substrate 210 among the first electrode 220, the second electrode 230, and the intermediate support 242. A material of the solder layer D includes tin-lead alloy, tin-silver alloy, gold, silver, tin, lead, bismuth, indium, gallium, palladium, nickel, copper, alloy thereof, and other metallic material, and the solder layer D can further includes 10-15% of the auxiliary medium to reduce the surface tension between the melted solder layer D and the metal element 280 and help expand the metal element 280 to ensure the blow result. However, in other embodiments, the metal element 280 can be fixed to the first electrode 220, the second electrode 230, and the intermediate support 242 through the implementation of an ultrasonic bonding technique without a solder layer D being disposed. Furthermore, in other embodiments, when a material of the solder layer D includes a solder alloy and 10 to 15% of an auxiliary medium material for example, a method of forming the auxiliary medium 270 includes heating the solder layer D (e.g. over 120° C.), so that the auxiliary medium material is softened and flows to the substrate 210 among the first electrode 220, the second electrode 230, and the intermediate support 242. If the auxiliary medium material is of insufficient amount, a second auxiliary medium (not shown) can be selectively added.

Thereafter, referring to FIG. 3C, a metal element 280 is disposed on the first electrode 220, the second electrode 230, and the intermediate support 242 through the solder layer D, so that the auxiliary medium 270 is sandwiched between the metal element 280 and the substrate 210. Particularly, the solder layer D has a fusing temperature lower than the melting temperature of the metal element 280. Thereby, when the heat-generating element 260 below the substrate 210 generates heat, the auxiliary medium 270 over the substrate 210 helps melt the metal element 280 disposed over the auxiliary medium 270.

Referring to FIGS. 5A to 5D, a protective device 200a according to another embodiment of the present invention is provided. The protective device 200a of the present embodiment is similar to the protective device 200 of FIGS. 1A to 1D, and the difference between the both lies in that the heat-generating element 260, the second extending portion 244, the third extending portion 252, and the insulating layer 290 of the protective device 200a are all disposed on the first surface S1 of the substrate 210.

Figure 5A:
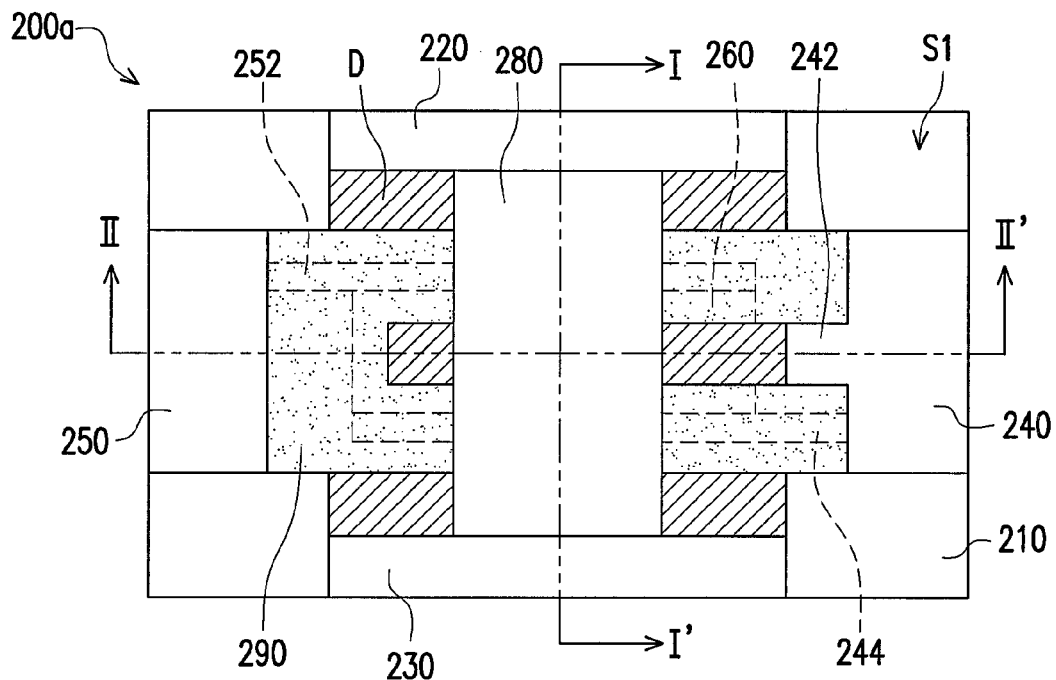
FIG. 5A is a top view of the protective device according to one embodiment of the present invention.
Figure 5B:
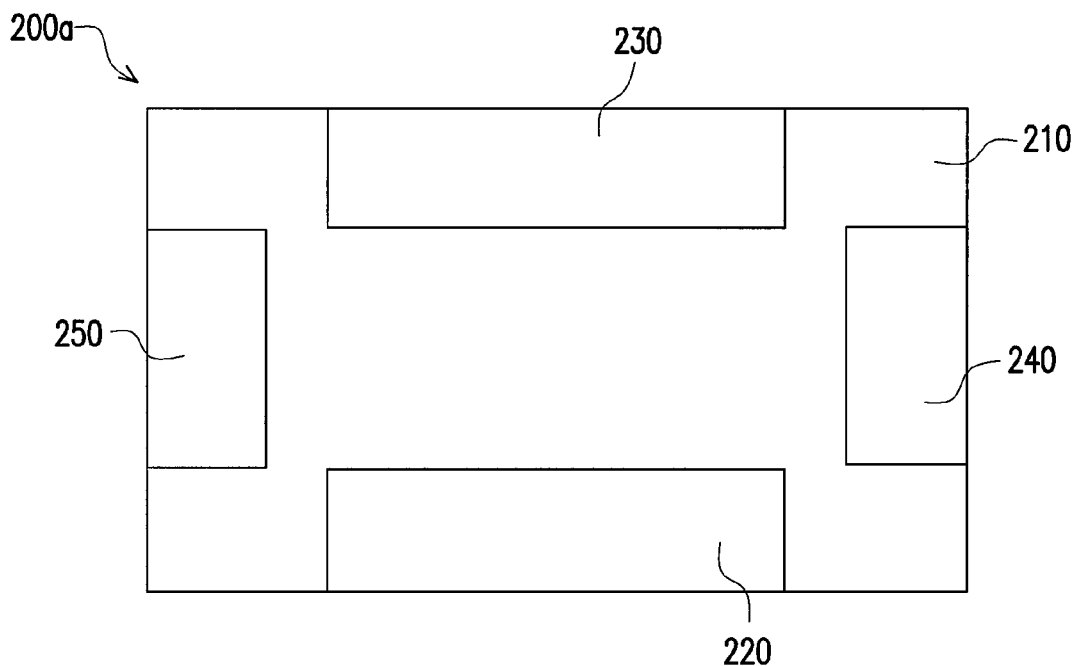
FIG. 5B is a bottom view of the protective device shown in FIG. 5A.
Figure 5C:
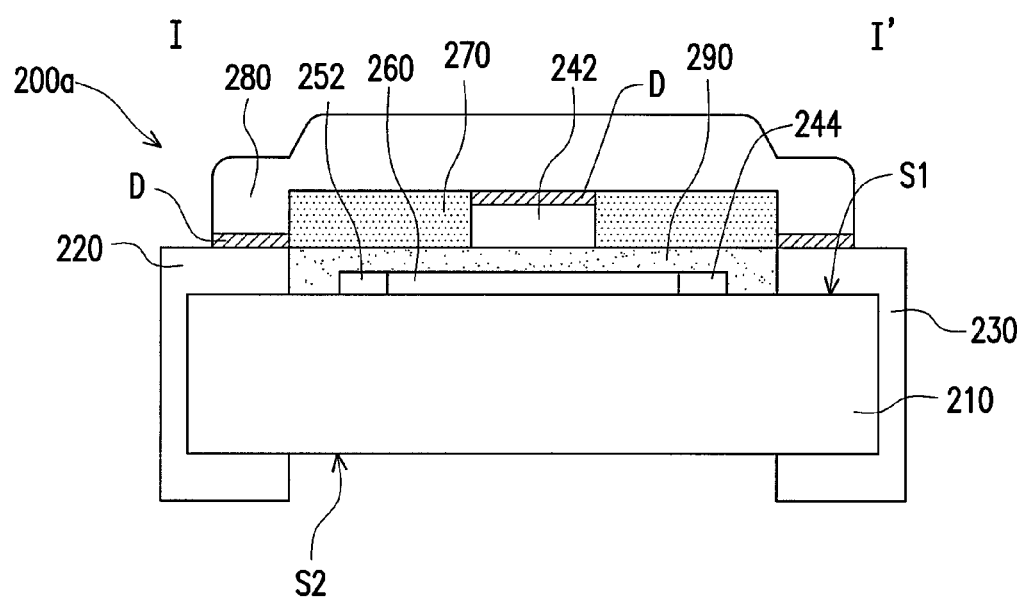
FIG. 5C is a cross-sectional view illustrating the protective device along a sectional line I-I' in FIG. 5A.
Figure 5D:
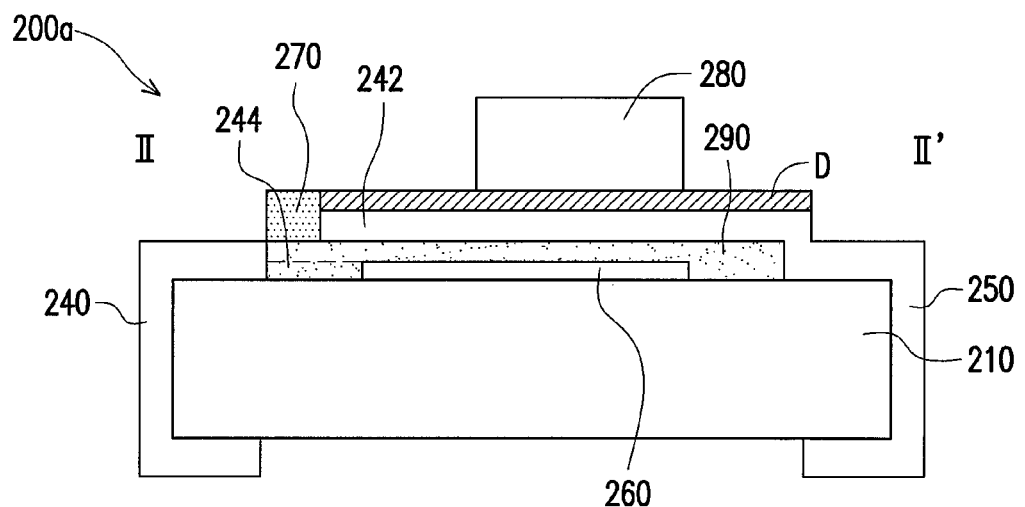
FIG. 5D is a cross-sectional view illustrating the protective device along a sectional line II-IF in FIG. 5A.

In detail, the second extending portion 244 and the third extending portion 252 are disposed on the first surface S1 and between the first electrode 220 and the second electrode 230. The heat-generating element 260 is electrically connected to the second extending portion 244 and the third extending portion 252, and the insulating layer 290 covers the heat-generating element 260, the second extending portion 244, and the third extending portion 252. The intermediate support 242 of the third electrode 240 extends to a location on or over the insulating layer 290. The auxiliary medium 270 is disposed on the insulating layer 290 and around the intermediate support 242. The metal element 280 is across the first electrode 220 and the second electrode 230, and covers the auxiliary medium 270 and the intermediate support 242, so that the auxiliary medium 270 is disposed between the metal element 280 and the insulating layer 290. Therefore, when the heat-generating element 260 generates heat, heat is conducted to the metal element 280 through the auxiliary medium 270 and the insulating layer 290, so as to melt the metal element 280. At this point, the auxiliary medium 270 directly contacting the metal element 280 helps melt the metal element 280. According to the present embodiment, the intermediate support 242 and the second extending portion 244 are respectively disposed on two planes (as shown by FIGS. 5C and 5D) which are substantially parallel but do not overlap with each other.

Furthermore, a manufacturing method of the protective device 200a is similar to that (shown by FIGS. 3A to 3C and 4A to 4C) of the protective device 200 shown in FIGS. 1A to 1D, and the differences merely lie in that, in the manufacturing method of the protective device 200a, steps of forming the second extending portion 244, the third extending portion 252, the heat-generating element 260, and the insulating layer 290 on the first surface S1 of the substrate 210 are first performed and followed by forming of the intermediate support 242 extending to a location on/over the insulating layer 290. Then, the auxiliary medium 270 is formed around the intermediate support 242, so that the metal element 280 covering the first electrode 220, the auxiliary medium 270, the intermediate support 242 and the second electrode 230 is formed.

Figure 6A:
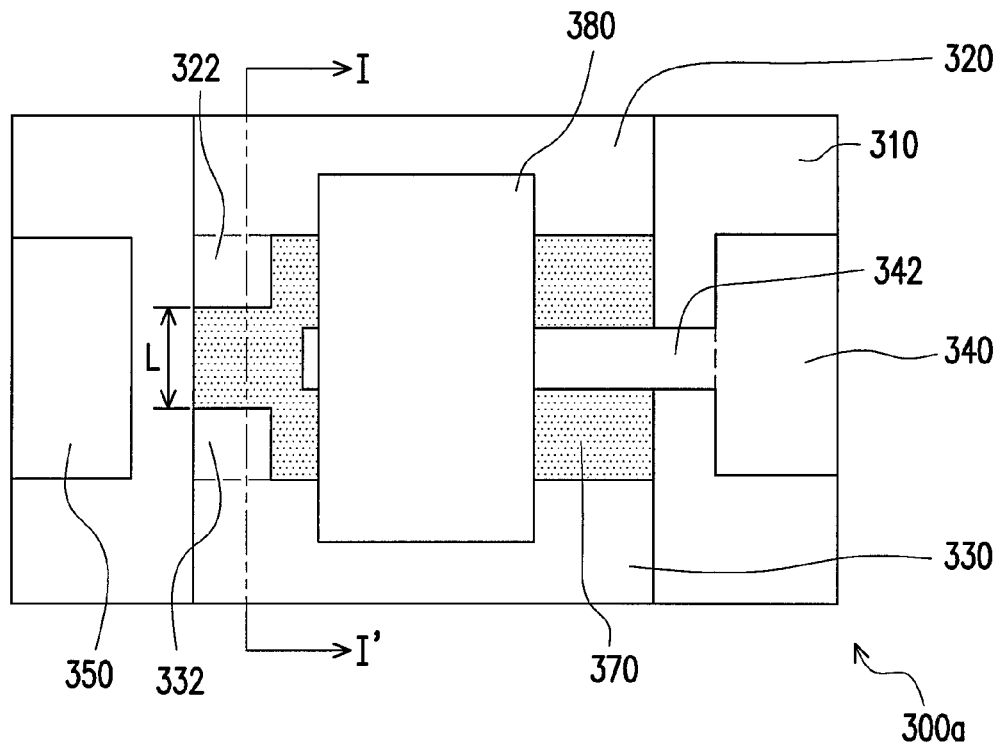
FIG. 6A is a schematic top view of a protective device according to an embodiment of the invention.
Figure 6B:
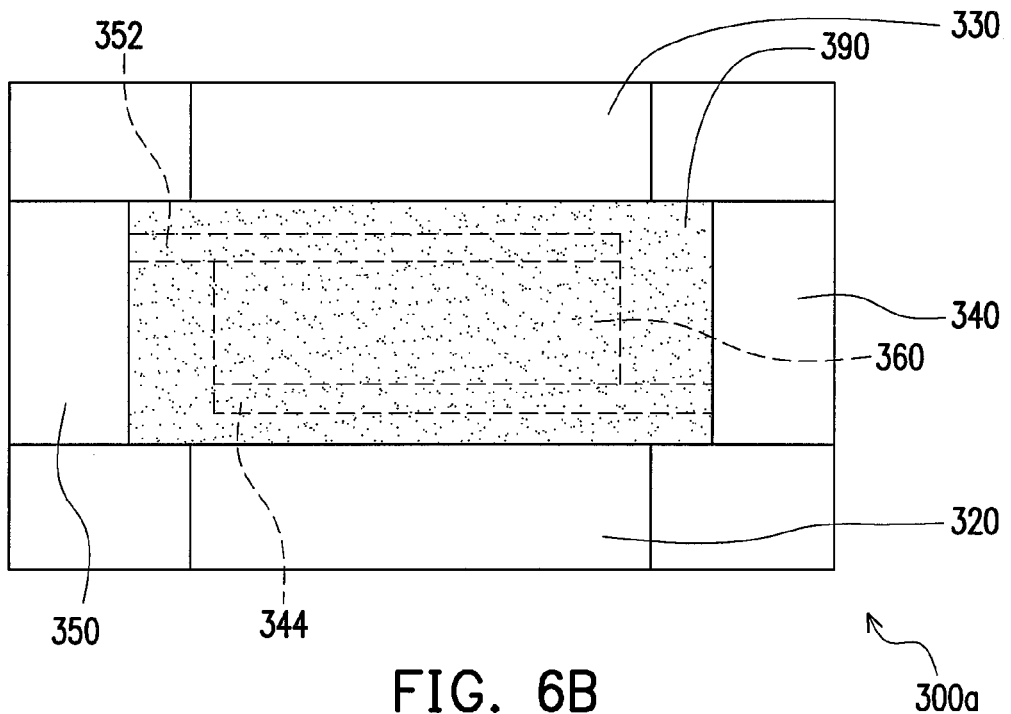
FIG. 6B is a bottom view of the protective device in FIG. 6A.
Figure 6C:
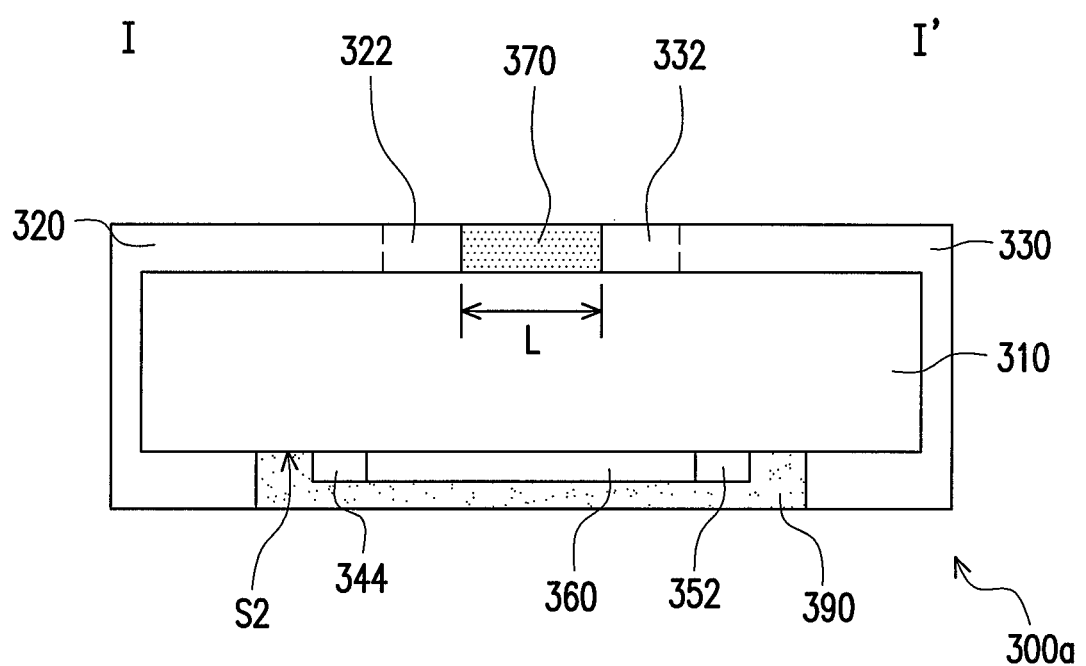
FIG. 6C is a schematic cross-sectional view taken along a line I-I' in FIG. 6A.

FIGS. 6A to 6C show another embodiment of a protective device 300a according to the present invention. The protective device 300a in FIGS. 6A to 6C is similar to the protective device 200 in FIGS. 1A to 1D, wherein the main difference is that the first electrode 320 of the protective device 300a in FIGS. 6A to 6C has a first protrusion 322, and the second electrode 330 has a second protrusion 332.

In more detail, both the first protrusion 322 and the second protrusion 332 are disposed between the intermediate support 342 and the third electrode 340, and a distance L is present between the first protrusion 322 and the second protrusion 332. According to the present embodiment, the distance L is preferably from 0.1 mm to 0.4 mm, so that short-circuiting between the first electrode 320 and the second electrode 330 is avoided.

Since according to the present embodiment, the first electrode 320 and the second electrode 330 respectively have the first protrusion 322 and the second protrusion 332, the melted metal element 380 is affected by surface tension to flow towards the first protrusion 322 and the second protrusion 332. In other words, the first protrusion 322 and the second protrusion 332 increase the flowing space and adhesive area of the melted metal element 380. Therefore, the melted metal element 380 does not accumulate or remain between the first electrode 320 and the intermediate support 342 or between the second electrode 330 and the intermediate support 342, thereby preventing short-circuiting.

In addition, here it should be noted that the forms of the first electrode 320 and the second electrode 330 are not limited in the invention. Although as mentioned here the first electrode 320 and the second electrode 320, as embodied, respectively have the first protrusion 322 and the second protrusion 332, the first electrode 320 and the second electrode 330 may have only one protrusion or a plurality of protrusions having different sizes according to other embodiments which are not shown. Said embodiments also belong to technical plans adoptable by the invention, and are therefore within the scope of the invention.

Figure 7A:
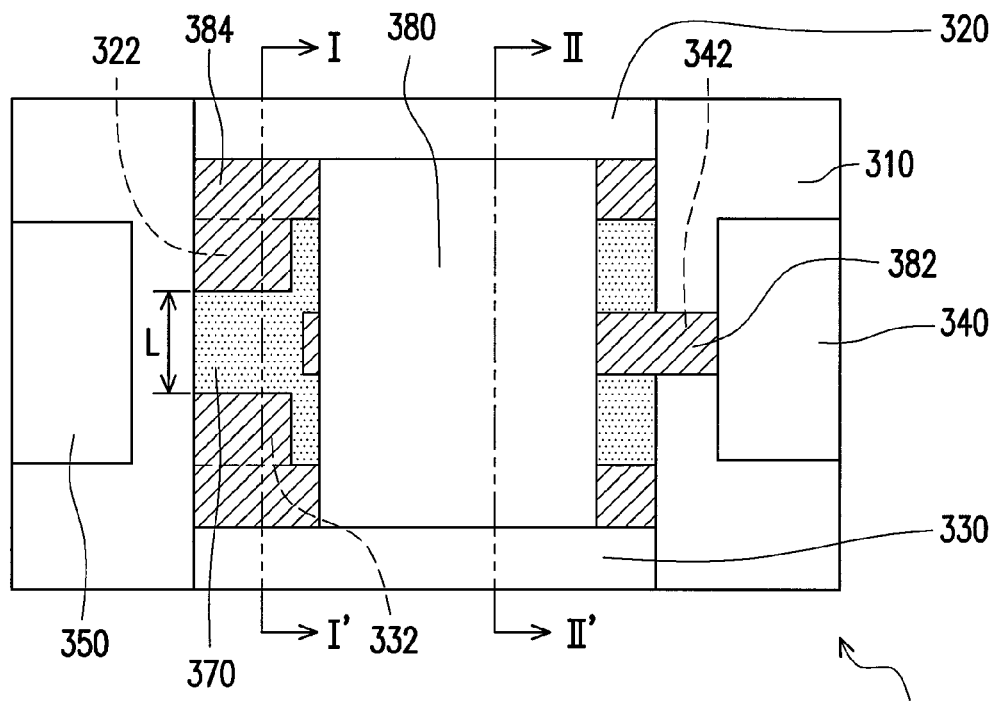
FIG. 7A is a schematic top view of a protective device according to another embodiment of the invention.
Figure 7B:
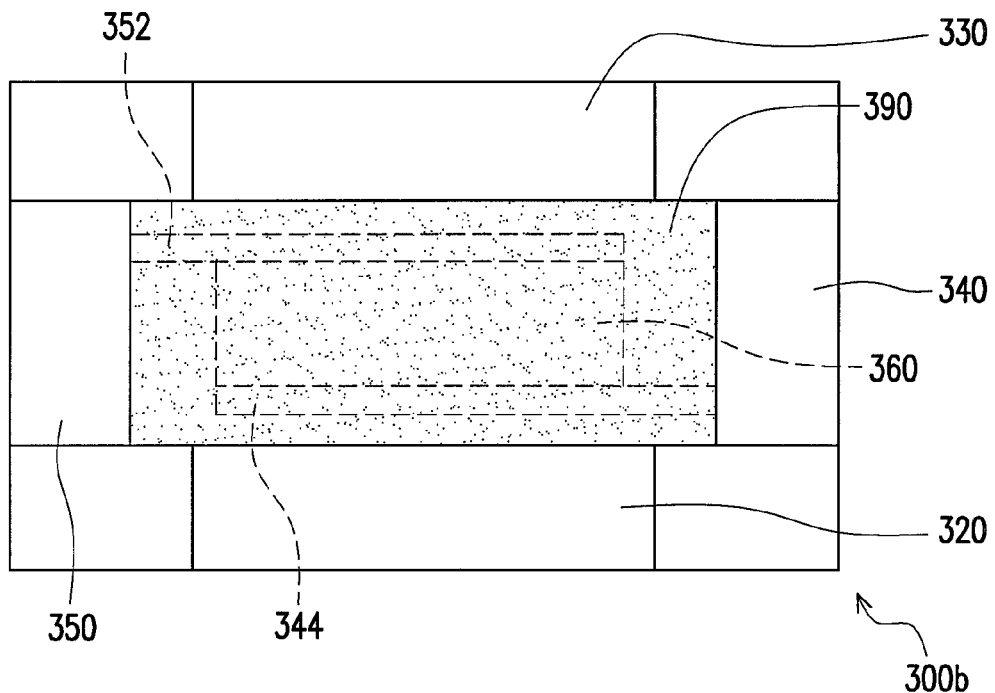
FIG. 7B is a bottom view of the protective device in FIG. 7A.
Figure 7C:
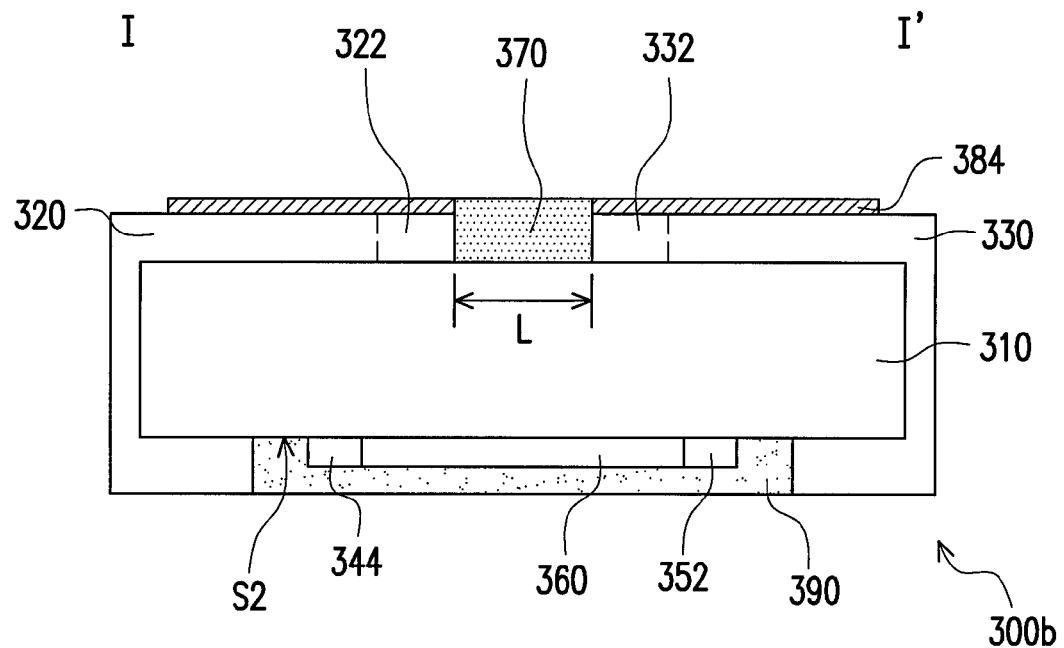
FIG. 7C is a schematic cross-sectional view taken along a line I-I' in FIG. 7A.
Figure 7D:
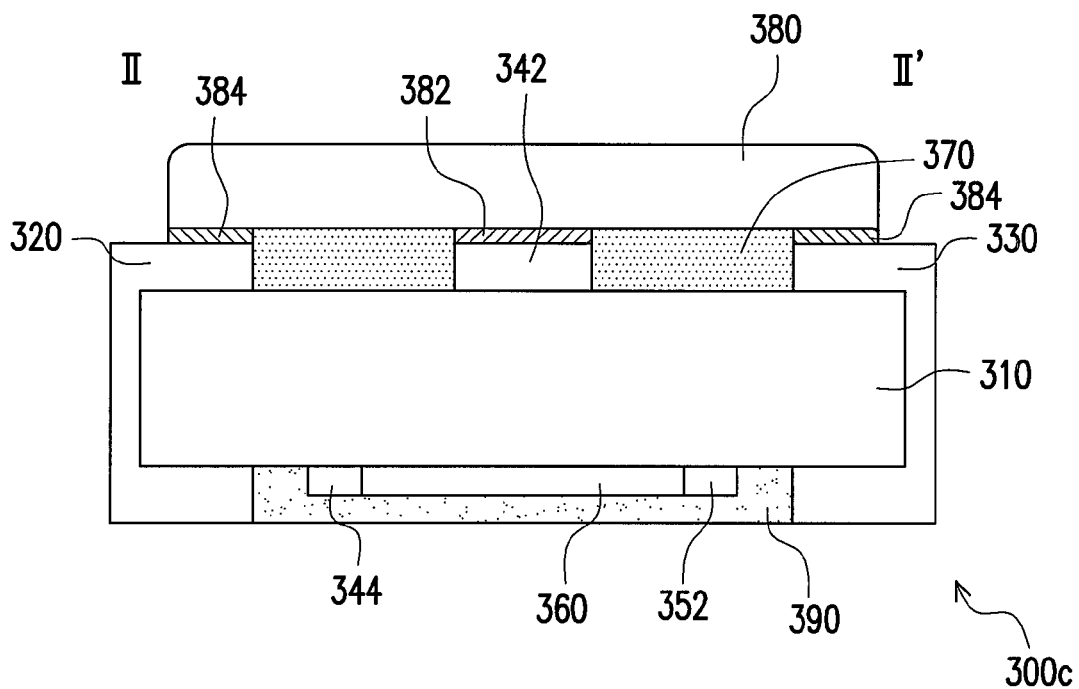
FIG. 7D is a schematic cross-sectional view taken along a line in FIG. 7A.

FIG. 7A is a schematic top view of a protective device according to another embodiment of the invention. FIG. 7B is a bottom view of the protective device in FIG. 7A. FIG. 7C is a schematic cross-sectional view taken along a line I-I' in FIG. 7A. FIG. 7D is a schematic cross-sectional view taken along a line II-II' in FIG. 7A. According to the present embodiment, a protective device 300b in FIGS. 7A to 7D is similar to the protective device 300a in FIGS. 6A to 6C, wherein the main difference is that the protective device 300b in FIGS. 7A to 7D further includes an intermediate layer on the first electrode 320, the second electrode 330, and the intermediate support 342, and having a fusing temperature lower than that of the metal element 380.

In detail, the intermediate layer may include a first intermediate layer 382 disposed between the metal element 380 and the intermediate support 342, and a second intermediate layer 384 disposed between the first electrode 320 and the second electrode 330. Therefore, when the heat-generating element 360 generates heat so that the auxiliary medium 370, the metal element 380, and the intermediate layer are all in a melted state, the melted metal element 380 has a wetting effect due to the intermediate layer and the auxiliary medium 370 in the melted state and flows towards the first protrusion 322 and the second protrusion 332 as being affected by surface tension. In other words, the intermediate layer and the auxiliary medium 370 in the melted state prevents the melted metal element 380 from accumulating or remaining between the first electrode 320 and the intermediate support 342 or between the second electrode 330 and the intermediate support 342, thereby preventing short-circuiting. Reliability of the protective device 300b is thereby further enhanced.

In addition, the intermediate layer may be a solder material, for example, a tin/silver alloy (96.5% tin and 3.5% silver), or a metal such as gold, silver, tin, lead, bismuth, indium, gallium, palladium, nickel, or copper, and the solder material may further include a flux. In this embodiment, the first intermediate layer 382 and the second intermediate layer 384 respectively include a first solder material having a first fusing temperature and a second solder material having a second fusing temperature.

In particular, according to the present embodiment, the melting temperature of the metal element 380 is higher than the fusing temperature of the second intermediate layer 384, and the fusing temperature of the second intermediate layer 384 is higher than a temperature (an assembly temperature) at which the protective device 300c is assembled on a circuit board (not shown). Moreover, the melting temperature of the metal element 380 is higher than the fusing temperature of the second intermediate layer 384, and the fusing temperature of the second intermediate layer 384 is higher than the fusing temperature of the first intermediate layer 382.

According to the present embodiment, the fusing temperature of the first intermediate layer 382 is lower than the fusing temperature of the second intermediate layer 384. Hence, when the heat-generating element 360 generates heat, the first intermediate layer 382 fuses with the metal element 380 thereon, so that the melting temperature of the metal element 380 is lowered, thereby reducing the time for fusing the metal element 380. In detail, when the fusing temperature of the first intermediate layer 382 is lower than the temperature at which the protective device 300c is assembled on the circuit board (not shown), during assembly of the first intermediate layer 382 on the protective device 300c, the first intermediate layer 382 first fuses with the metal element 380 thereon, so that the melting temperature of the metal element 380 is lowered, thereby reducing the time for fusing the metal element 380. In addition, the second intermediate layer 384 having a higher fusing temperature is formed on the first electrode 320 and the second electrode 330, so that when assembling the protective device 300c on the circuit board (not shown), shifting of the metal element 380 caused by melting of the second intermediate layer 384 is prevented, and resistance is not affected after assembly.

Figure 8A:
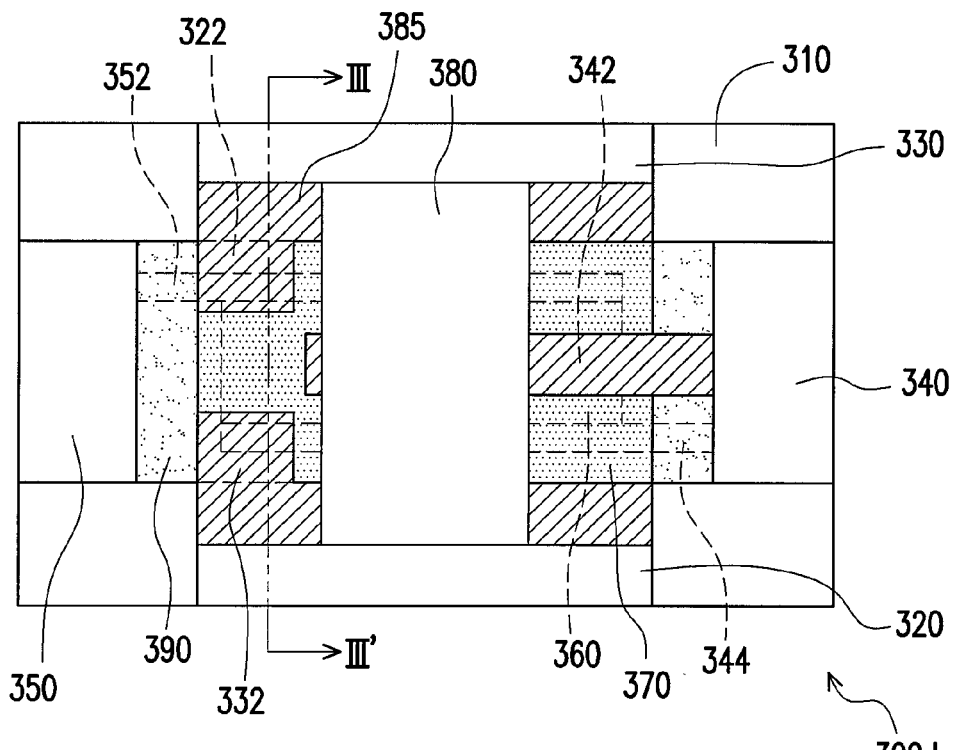
FIG. 8A is a schematic top view of a protective device according to another embodiment of the invention.
Figure 8B:
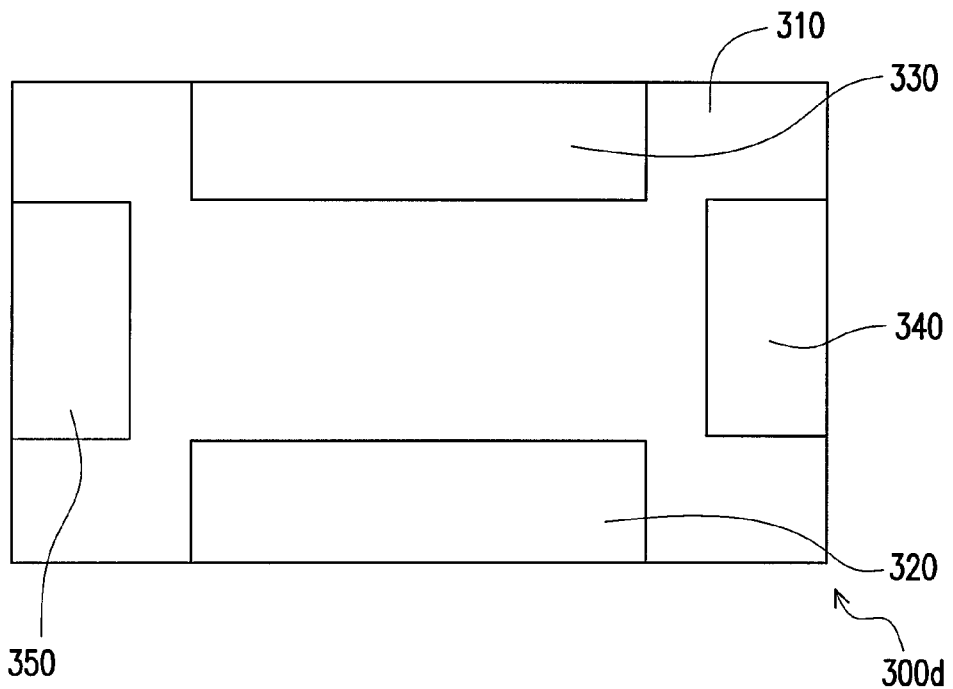
FIG. 8B is a bottom view of the protective device in FIG. 8A.
Figure 8C:
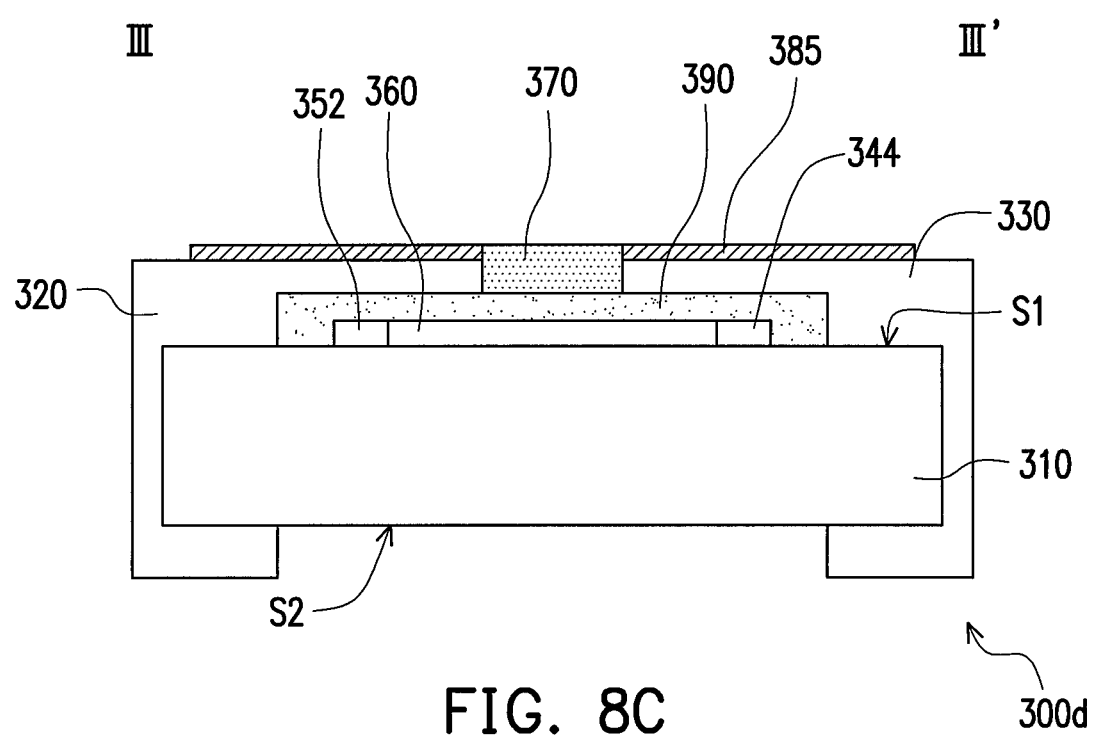
FIG. 8C is a schematic cross-sectional view taken along a line in FIG. 8A.

Please refer to all FIGS. 8A, 8B, and 8C. According to another embodiment of the invention, a protective device 300d in FIGS. 8A to 8C is similar to the protective device 300a in FIGS. 6A to 6C, wherein the main difference is that in the protective device 300d in FIGS. 8A to 8C, the heat-generating element 360, the second extending portion 344, and the third extending portion 352 are all disposed on the first surface S1 of the substrate 310.

To be more specific, in the present embodiment, the second extending portion 344 and the third extending portion 352 are disposed between the first electrode 320 and the second electrode 330, and the heat-generating element 360 is disposed on the first surface S1 of the substrate 310 and connects the second extending portion 344 and the third extending portion 352. The insulation layer 390 is disposed between the intermediate support 342 and the second extending portion 344 and the third extending portion 352, meaning that the intermediate support 342 is disposed on a surface of the insulation layer 390, and the second extending portion 344 and the third extending portion 352 are disposed on another opposite surface of the insulation layer 390. In particular, orthographic projections of the intermediate support 342, the second extending portion 344, and the third extending portion 352 on the insulation layer 390 do not overlap.

Moreover, the auxiliary medium 370 is disposed on the insulation layer 390, between the intermediate support 342 and the first electrode 320 and between the intermediate support 342 and the second electrode 330. The metal element 380 covers a part of the first electrode 320, the auxiliary medium 370, the intermediate support 342, and the second electrode 330, so that the auxiliary medium 370 is disposed between the metal element 380 and the insulation layer 390. Hence, when the heat-generating element 360 generates heat, heat is conducted to the auxiliary medium 370 and the metal element 380 through the insulation layer 390, so that the metal element 380 is melted. In the meantime, the auxiliary medium 370 which directly contacts the metal element 380 also facilitates melting of the metal element 380.

Figure 9A:
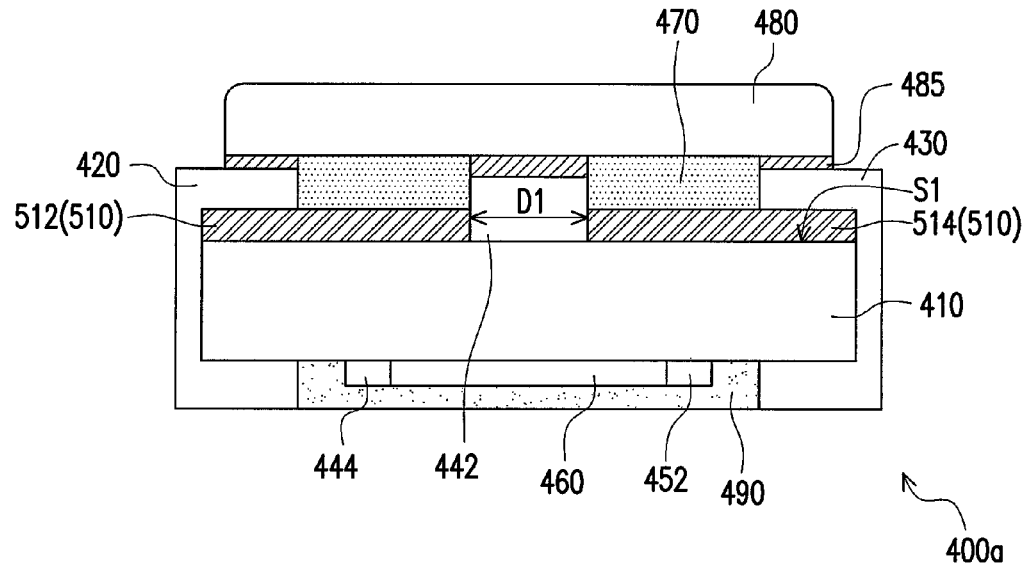
FIG. 9A is a schematic cross-sectional view of a protective device according to another embodiment of the invention.
Figure 9B:
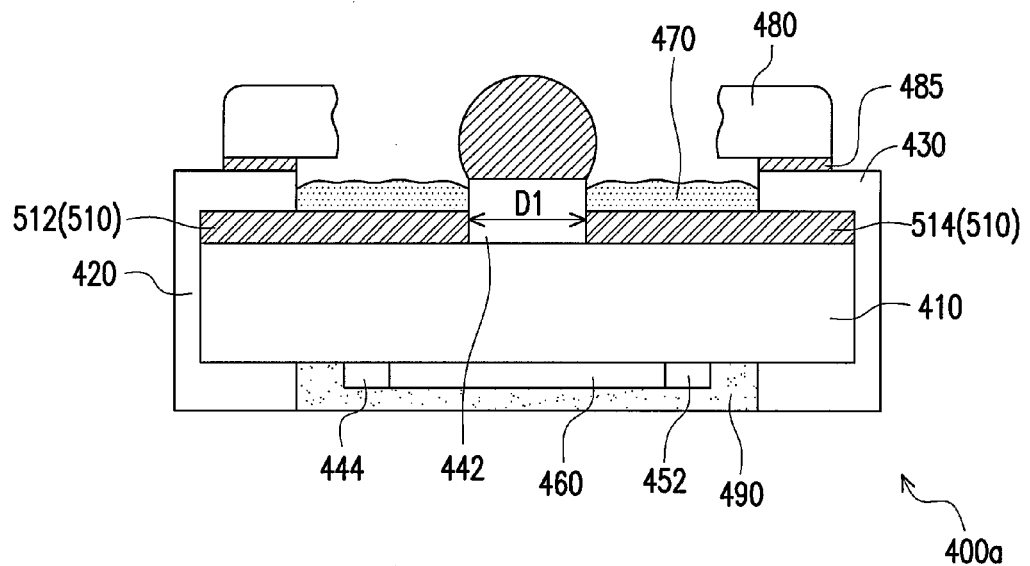
FIG. 9B is a schematic cross-sectional view of the protective device in FIG. 9A after breaking.

FIG. 9A is a schematic cross-sectional view of a protective device according to another embodiment of the invention. FIG. 9B is a schematic cross-sectional view of the protective device in FIG. 9A after breaking. According to the present embodiment, a protective device 400a in FIG. 9A is similar to the protective device 200 in FIGS. 1A to 1D, wherein the main difference is that the protective device 400a in FIG. 9A has a first insulating layer 510.

In more detail, the first insulating layer 510 of the protective device 400a is disposed on the first surface S1 of the substrate 410, and has a first low thermal conductive portion 512 and a second low thermal conductive portion 514 unconnected to the first low thermal conductive portion 512. Herein, the first low thermal conductive portion 512 is located between the heat-generating element 460 and the first electrode 420, the second low thermal conductive portion 514 is located between the heat-generating element 460 and the second electrode 430, and the auxiliary medium 470 covers at least a portion of the first insulating layer 510. Specifically, the first low thermal conductive portion 512 is located between the substrate 410 and the first electrode 420, and the second low thermal conductive portion 514 is located between the substrate 410 and the second electrode 430. A first space D1 exists between the first low thermal conductive portion 512 and the second low thermal conductive portion 514, and the intermediate support 442 of the third electrode 440 is disposed in the first space D1. In addition, a material of the first insulating layer 510 includes a glass material or a polymer material, for example. A thermal conductivity coefficient of the first insulating layer 510 is smaller than that of substrate 410, preferably, a thermal conductivity coefficient of the first insulating layer 510 is smaller than 2 W/(m·K). For instance, the glass material can be $SiO_2$, $Na_2O_3$, $B_2O_3$, MgO, CaO, etc. A thermal conductivity coefficient of the glass material is between 1 W/(m·K) and 1.5 W/(m·K). The polymer material can be a polyurethane (PU), polyimide, epoxy or UV curing resin, for example. A thermal conductivity coefficient of the polymer material is between 0.19 W/(m·K) and 0.6 W/(m·K).

Particularly, the thermal conductivity coefficient of the substrate 410 is greater than that of the first insulating layer 510. That is, relative to the first insulating layer 510, the substrate 410 is referred as a high thermal conductive layer, so that the heat generated by the heat-generating element 460 can directly pass through the central portion of the substrate 410 and be quickly transferred to the intermediate support 442. Certainly, the substrate 410 and the first insulating layer 510 can be made of the same material, namely, the substrate 410 can be referred as a low thermal conductive layer. However, a sum of a thickness of the substrate 410 and a thickness of the first insulating layer 510 is substantially greater than the thickness of the substrate 410. Therefore, the heat generated by the heat-generating element 460 can be directly passed through the central portion of the substrate 410 and be quickly transferred to the intermediate support 442, and than the metal element 480 located on the intermediate support 442 will be melted at first to protect the electric circuit from over voltage and/or current, as shown in FIG. 9B. In other word, the material of the substrate 410 can be selected according to practical requirements without influencing the efficacy of the present embodiment.

The protective device 400a in the present embodiment has the first insulting 510. Hence, when the heat-generating element 460 generates heat and transfers heat to the electrodes through the substrate 410, a portion of heat generated by the heat-generating element 460 will be obstructed by the first insulating layer 510 so as to reduce the heat which first electrode 420 and the second electrode 430 are obtained, and the other portion of heat generated by the heat-generating element 460 will be directly transferred to the metal element 480 via the third electrode 440 so as to blow the metal element 480 located over the third electrode 440, namely, the melt value of metal element 480 can be reduced. Consequently, the adhesive area of the melted metal element 480 can be controlled effectively to obtain the stable melt time and mode, the alignment error of the process between the heat-generating element 460 and the third electrode 440 can be reduced, and over voltage protection or an over current protection is achieved.

In other aspect, since the melt value of the metal element 480 is reduced, the driving time for protective device 400a in over voltage protection is reduced, and the short-circuiting caused by the melted metal element 480 electrically connecting the intermediate support 442 and the first electrode 420 or the intermediate support 442 and the second electrode 430 is also reduced. Thereby, reliability of the protective device 400a is also enhanced. Moreover, since the intermediate support 442 is disposed in a first space D1 existing between the low thermal conductive portion 512 and the second low thermal conductive portion 514, the auxiliary medium 470 can be guide to the peripheral of the intermediate support 442. Therefore, the intermediate support 442 can has a better wetting effect to make sure the stable of the melt time for melting the metal element 480.

Figure 10:
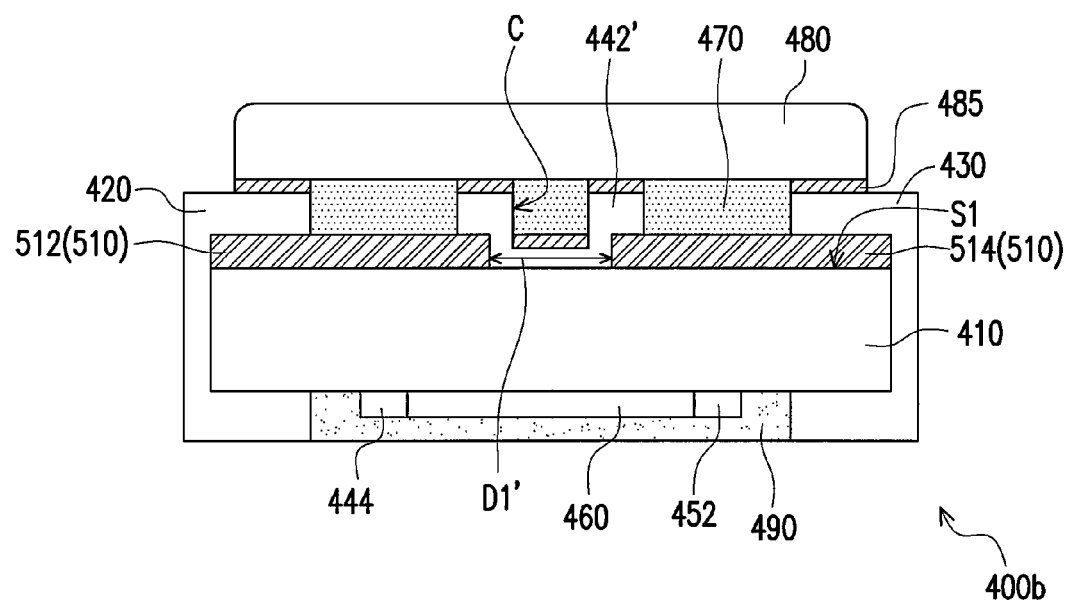
FIG. 10 is a schematic cross-sectional view of a protective device according to another embodiment of the invention.

FIG. 10 is a schematic cross-sectional view of a protective device according to another embodiment of the invention. According to the present embodiment, a protective device 400b in FIG. 10 is similar to the protective device 400a in FIG. 9A, wherein the main difference is that the intermediate support 442' of the protective device 400b in FIG. 10 has different design.

In more detail, a portion of the intermediate support 442' is located in the first space DP, and the other portion of the intermediate support 442' is located on the first low thermal conductive portion 512 and the second low thermal conductive portion 514. Specifically, in the present embodiment, since a distance of the first space D1' is grater than that of the first space D1, a notch structure C is produced in the intermediate support 442' due to the gravity during fabricating the electrode. Namely, the intermediate support 442' has the notch structure C located in the first space D1 and thereby producing a three-dimensional structure in the intermediate support 442' at the same space. Therefore, the adhesive area of the melted metal element 480 can be increased. Moreover, the auxiliary medium 470 can also be added in the notch structure C so that the intermediate support 442' has a better absorption ability for adsorbing the melted metal element 480.

Figure 11:
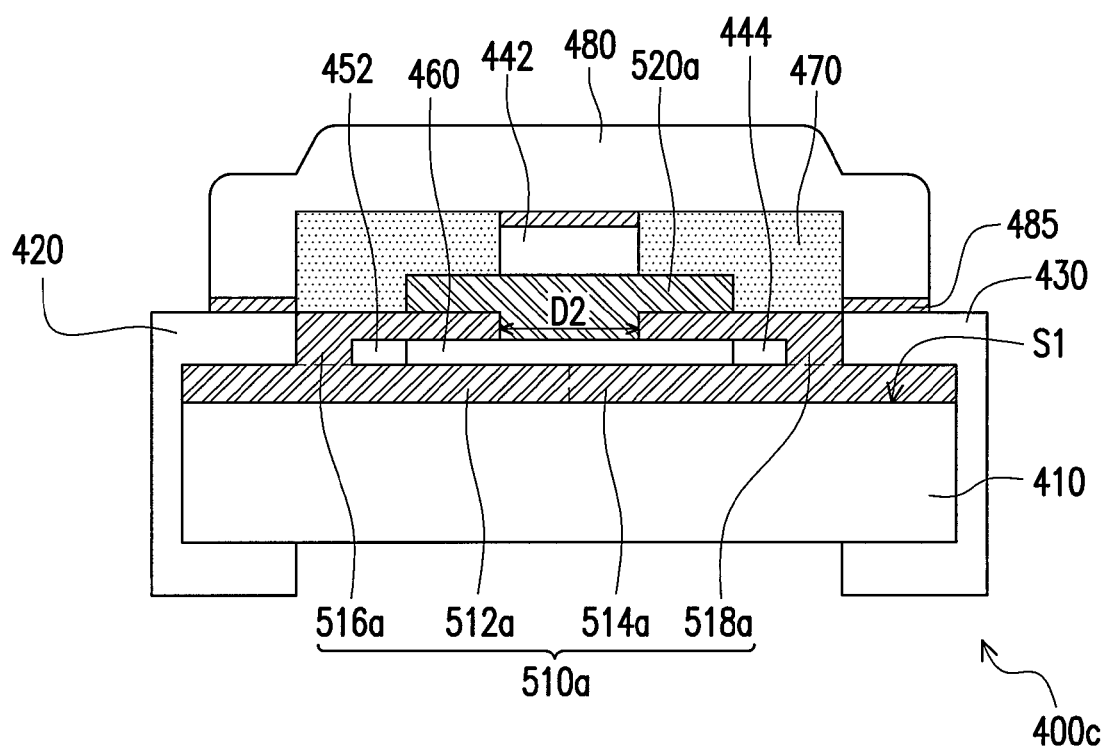
FIG. 11 is a schematic cross-sectional view of a protective device according to another embodiment of the invention.

FIG. 11 is a schematic cross-sectional view of a protective device according to another embodiment of the invention. According to the present embodiment, a protective device 400c in FIG. 11 is similar to the protective device 400a in FIG. 9A, wherein the main difference is that in the protective device 400c in FIG. 11, the heat-generating element 460, the second extending portion 444, and the third extending portion 452 are all disposed on the first surface S1 of the substrate 410, and the protective device 400c further includes a second insulating layer 520a. Herein, a thermal conductivity coefficient of the second insulating layer 520a is greater than that of the first insulating layer 510a.

To be more specific, in the present embodiment, the second extending portion 444 and the third extending portion 452 are disposed between the first electrode 420 and the second electrode 430, and the heat-generating element 460 is disposed on the first surface S1 of the substrate 410 and connects the second extending portion 444 and the third extending portion 452. In particular, orthographic projections of the intermediate support 442, the second extending portion 444, and the third extending portion 452 on the first surface S1 of the substrate 410 do not overlap.

Moreover, the second insulating 520a of the protective device 400c in the present embodiment is disposed between the heat-generating element 460 and the intermediate support 442 of the third electrode 430. Herein, the first low thermal conductive portion 512a connects the second low thermal conductive portion 514a, and the heat-generating element 460 is located between the second insulating layer 520a and the first insulating layer 510a. Specifically, the first insulating layer 510a in the present embodiment further includes a third low thermal conductive portion 516a and a fourth low thermal conductive portion 518a. The third low thermal conductive portion 516a connects the first low thermal conductive portion 512a and extends to the third extending portion 452, and the fourth low thermal conductive portion 518a connects the second low thermal conductive portion 514a and extends to the second extending portion 444. In the present embodiment, a second space D2 exists between the third low thermal conductive portion 516a and the fourth low thermal conductive portion 518a, and a portion of the second insulating layer 520a is located on the third low thermal conductive portion 516a and the fourth low thermal conductive portion 518a. In addition, in order to make a greater part of heat generated by the heat-generating element 460 transfer to the intermediate support 442, preferably, a thermal conductivity coefficient of the second insulating layer 520a is greater than a multiple of that of the first insulating layer 510a. For example, a material of the second insulating layer 520a can be a ceramic material, for example, $Al_2O_3$, BN, AlN. A thermal conductivity coefficient of $Al_2O_3$ is between 28 W/(m·K) and 40 W/(m·K); a thermal conductivity coefficient of BN is between 50 W/(m·K) and 60 W/(m·K); a thermal conductivity coefficient of AlN is between 160 W/(m·K) and 230 W/(m·K). Preferably, a thermal conductivity coefficient of the second insulting layer 520a is between 8 W/(m·K) and 80 W/(m·K).

The second insulating layer 520a of the protective device 400c is located between the intermediate support 442 and the heat-generating element 460. Hence, when the heat-generating element 460 generates heat, a greater part of heat generated by the heat-generating element 460 will be directly transferred to the intermediate support 442, and the metal element 480 located on the intermediate support 442 will be quickly blown so as to reduce the melt value of the metal element 480, and over voltage protection or an over current protection is achieved.

Figure 12:
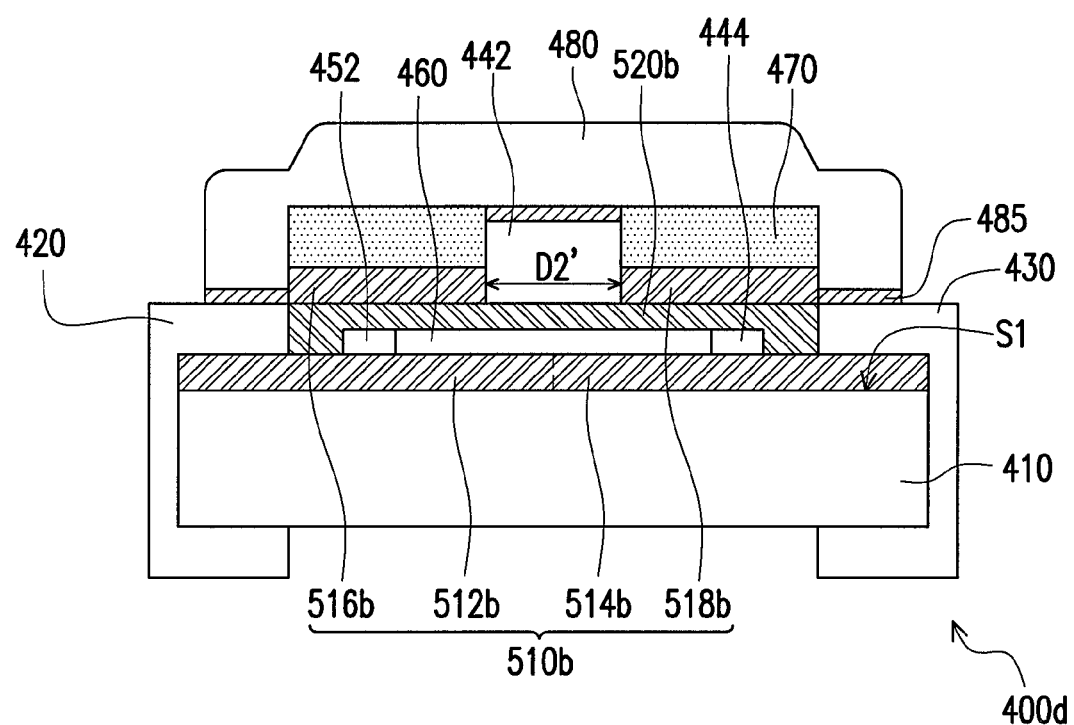
FIG. 12 is a schematic cross-sectional view of a protective device according to another embodiment of the invention.

FIG. 12 is a schematic cross-sectional view of a protective device according to another embodiment of the invention. According to the present embodiment, a protective device 400d in FIG. 12 is similar to the protective device 400c in FIG. 11 except that the first insulating layer 510b and the second insulting layer 520b of the protective device 400d in FIG. 12 have a different disposing position.

In more detail, the third low thermal conductive portion 516b and the fourth low thermal conductive portion 518b are disposed on the second insulating layer 520b, a second space D2' exists the third low thermal conductive portion 516b and the fourth low thermal conductive portion 518b, and the intermediate support 442 is disposed in the second space D2'. The protective device 400d of the present embodiment has the first insulating layer 510b and the second insulating layer 520b simultaneously. Hence, when the heat-generating element 460 generates heat, a portion of heat generated by the heat-generating element 460 will be obstructed by the third low thermal conductive portion 516b and the fourth low thermal conductive portion 518b, thereby heat transferred to the metal element 480 located over the third low thermal conductive portion 516b and the fourth low thermal conductive portion 518b can be reduced. In other aspect, the other portion of heat generated by the heat-generating element 460 will be directly transferred to the metal element 480 via the second insulating layer 520b and the intermediate support 442 so as to blow the metal element 480 located over the intermediate support 442. Consequently, the melt value of metal element 480 can be reduced so as to reducing the driving time for protective device 400d in over voltage protection, and over voltage protection or an over current protection can be achieved at the same time.

Figure 13:
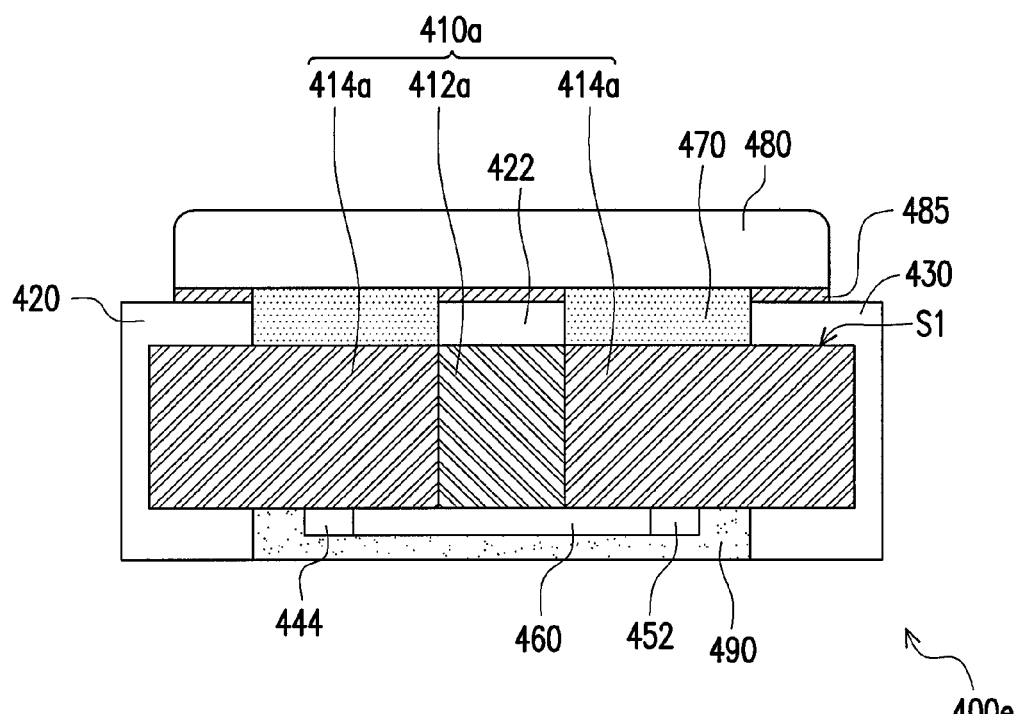
FIG. 13 is a schematic cross-sectional view of a protective device according to another embodiment of the invention.

FIG. 13 is a schematic cross-sectional view of a protective device according to another embodiment of the invention. According to the present embodiment, a protective device 400e in FIG. 13 is similar to the protective device 400a in FIG. 9A except that the substrate 410a of the protective device 400e in FIG. 13 is different from the substrate 410 of the protective device 400a in FIG. 9A.

In more detail, the substrate 410a has a first insulating block 412a and a second insulating block 414a connected to the first insulating block 412a. Herein, the second insulating block 414a surrounds the first insulating block 412a, and the first insulating block 412a and the second insulating block 414a are substantially co-planar. The intermediate support 442 is located on the first insulating block 412a, and the first electrode 420 and the second electrode 430 are located on the second insulating block 414a. The auxiliary medium 470 is disposed on the first surface S1 of the substrate 410a and located between the intermediate support 442 and the first electrode 420 and between the intermediate support 442 and the second electrode 430. Herein, the auxiliary medium 470 covers a portion of the second insulating block 414a. Particularly, a thermal conductivity coefficient of the first insulating bock 412a is greater than that of the second insulating block 414a.

Specifically, in the present embodiment, a material of the first insulating block 412a, for example, may be a ceramic material. The ceramic material may be $Al_2O_3$, BN, or AlN. Preferably, a thermal conductivity coefficient of the first insulating block 412a is between 8 W/(m·K) and 40 W/(m·K). In other aspect, a material of the second insulating block 414a is, for example, a glass material or a polymer material. For instance, the glass material can be $SiO_2$, $Na_2O_3$, $B_2O_3$, MgO, CaO, etc., and the polymer material can be a polyurethane (PU), polyimide, epoxy or UV curing resin. A thermal conductivity coefficient of the second insulating block 414a is smaller than 2 W/(m·K).

The heat-generating element 460 is located on the first insulating bock 412a. Hence, when the heat-generating element 460 generates heat, a greater part of heat generated by the heat-generating element 460 will be directly transferred to the intermediate support 442 through the first insulating bock 412a, and the metal element 480 located on the intermediate support 442 will be quickly blown so as to reduce the melt value of the metal element 480, and over voltage protection or an over current protection is achieved.

Figure 14:
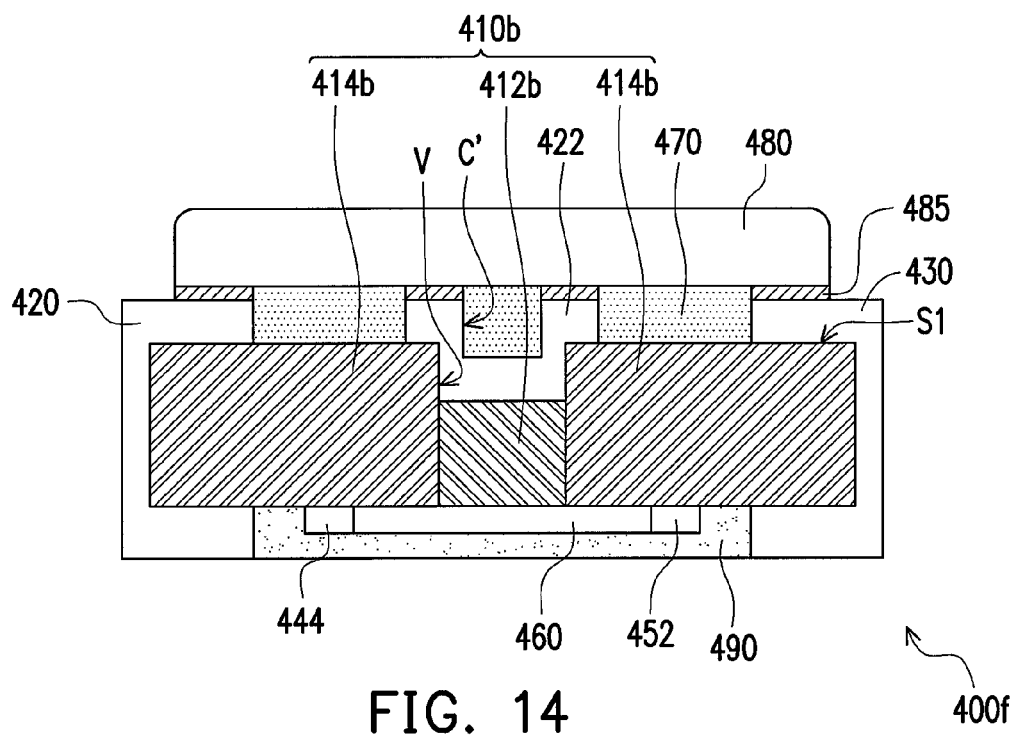
FIG. 14 is a schematic cross-sectional view of a protective device according to still another embodiment of the invention.

FIG. 14 is a schematic cross-sectional view of a protective device according to still another embodiment of the invention. According to the present embodiment, a protective device 400f in FIG. 14 is similar to the protective device 400e in FIG. 13 except that the first insulating block 412b and the second insulating block 414b of the substrate 410b of the protective device 400f in FIG. 14 are not co-planar substantially.

In more detail, a thickness of the first insulating bock 412b is lower than a thickness of the second insulating block 414b, and the first insulating bock 412b is surrounded by the second insulating block 414b to form a notch V. A portion of the intermediate support 422 is disposed in the notch V and located on the first insulating block 412b, and the other portion of the intermediate support 422 is disposed on the second insulating block 414b. Specifically, in the present embodiment, since the notch V exists between the first insulating block 412b and the second insulating block 414b, during fabricating the electrode, a notch structure C' is produced in the intermediate support 442 due to the gravity. Therefore, a three-dimensional structure is produced in the intermediate support 442 at the same space, and the adhesive area of the melted metal element 480 can be increased. Moreover, the auxiliary medium 470 can also be added in the notch structure C' so that the intermediate support 442 has better absorption ability for adsorbing the melted metal element 480.

Figure 15:
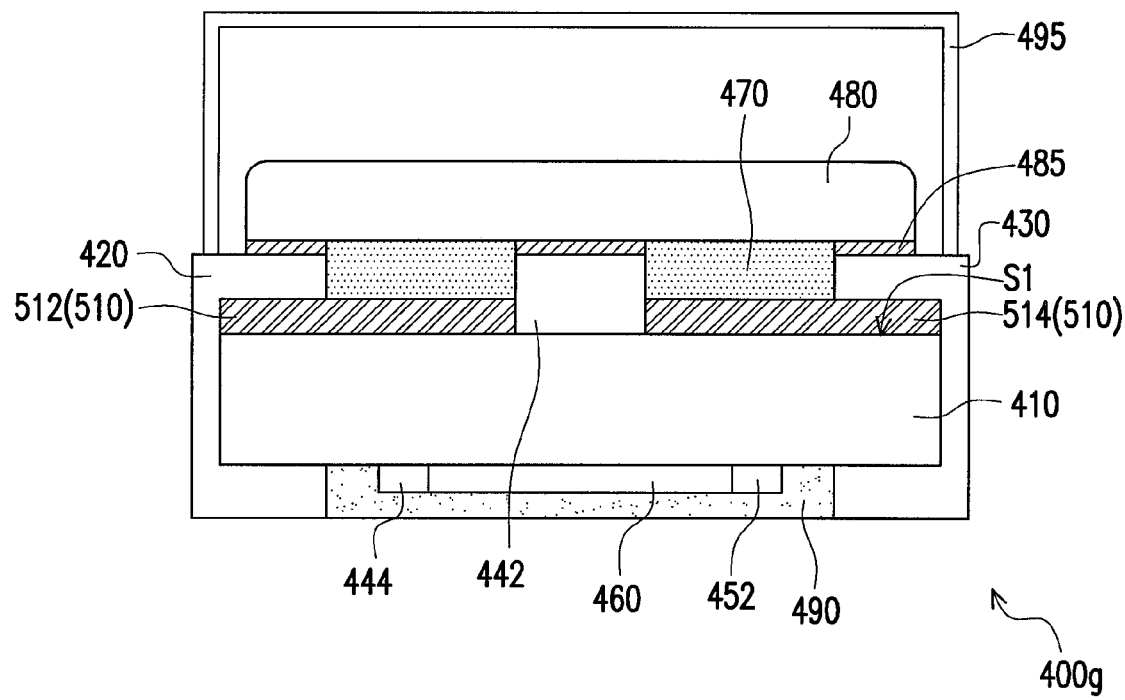
FIG. 15 is a schematic cross-sectional view of a protective device according to still another embodiment of the invention.

FIG. 15 is a schematic cross-sectional view of a protective device according to still another embodiment of the invention. According to the present embodiment, a protective device 400g in FIG. 15 is similar to the protective device 400a in FIG. 9A, wherein the main difference is that the protective device 400g in FIG. 15 includes a housing 495. In detail, the housing 495 is disposed on the first surface S1 of the substrate 410, covers the metal element 480 to protect the metal element 480, and prevents problems such as circuit interference caused by spilling of the melted metal element 480, the auxiliary medium 470, and solder layer 485. In addition, the material of the housing 495 includes, for example, alumina, polyetheretherketone (PEEK), nylon, thermal-curing resin, UV-curing resin, or phenol formaldehyde resin.

It should be noted that the above embodiments are only illustrated as examples. In other embodiments which are not shown, persons having ordinary skills in the art may select the above components or combine them according to practical requirements, so as to achieve required technical effects. In view of the foregoing, it is intended that the present invention cover modifications and variations of this invention provided they fall within the scope of the following claims and their equivalents.

What is claimed is:

1. A protective device, comprising:
   a substrate,
   a conductive section supported by the substrate, wherein the conductive section comprises a metal element electrically connected between first and second electrodes, wherein the metal element serves as a sacrificial structure having a melting point lower than that of the first and second electrodes; and
   a first auxiliary medium disposed between the metal element and the substrate, wherein the first auxiliary medium has a melting point lower than that of the metal element, and
   wherein the first auxiliary medium facilitates breaking of the metal element upon melting.

2. The protective device as in claim 1, further comprising a heat-generating element supported by the substrate, providing heat to at least the first auxiliary medium.

3. The protective device as in claim 2, wherein the heat-generating element is supported between the metal element and the substrate.

4. The protective device as in claim 2, wherein the heat-generating element is supported by a side of the substrate away from the metal element.

5. The protective device as in claim 1, further comprising an intermediate support disposed between the metal element and the substrate, wherein the first auxiliary medium is disposed on either side of the intermediate support.

6. The protective device as in claim 5, further comprising a first intermediate layer between the metal element and the intermediate support, wherein the first intermediate layer has a first fusing temperature lower than the melting temperature of the metal element.

7. The protective device as in claim 6, further comprising a second intermediate layer between the metal element and the first and second electrodes, wherein the second intermediate layer has a second fusing temperature higher than the first fusing temperature of the first intermediate layer.

8. The protective device as in claim 7, wherein the first intermediate layer comprises a first solder material having the first fusing temperature and the second intermediate layer comprises a second solder material having the second fusing temperature.

9. The protective device as in claim 5, further comprising a heat-generating element supported by the substrate, providing heat to at least the intermediate support.

10. The protective device as in claim 9, wherein the heat-generating element is supported between the metal element and the substrate.

11. The protective device as in claim 9, wherein the heat-generating element is supported by a side of the substrate away from the metal element.

12. The protective device as in claim 9, further comprising a heat insulation portion between the heating element and the first and second electrodes, wherein heat transfer to the intermediate support is at a higher rate than that to the first and second electrodes.

13. The protective device as in claim 5, wherein at least the first electrode comprises a protrusion extending towards the metal element, wherein the protrusion provides additional contact for melted metal element.

14. The protective device as in claim 5, wherein the intermediate support comprises an extension of an electrode coupled to a heat-generating element.

15. The protective device as in claim 5, wherein the intermediate support comprises a notch structure contacting to the metal element.

16. The protective device as in claim 1, wherein the substrate comprises a first insulating block and a second insulating block under the first and second electrodes, wherein a thermal conductivity coefficient of the first insulating bock is greater than that of the second insulating block.

* * * * *